(12) United States Patent
Kim et al.

(10) Patent No.: US 12,231,880 B2
(45) Date of Patent: Feb. 18, 2025

(54) ELECTRONIC DEVICE AND METHOD FOR DETERMINING PROVISIONING DEVICE OF EDGE COMPUTING NETWORK

(71) Applicant: SAMSUNG ELECTRONICS CO., LTD., Suwon-si (KR)

(72) Inventors: Eunchul Kim, Suwon-si (KR); Seokhyun Kim, Suwon-si (KR); Jongwon Lee, Suwon-si (KR); Gajin Song, Suwon-si (KR); Sunkee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 17/679,524

(22) Filed: Feb. 24, 2022

(65) Prior Publication Data
US 2022/0264297 A1 Aug. 18, 2022

Related U.S. Application Data

(63) Continuation of application No. PCT/KR2022/001120, filed on Jan. 21, 2022.

(30) Foreign Application Priority Data

Feb. 10, 2021 (KR) .................. 10-2021-0019242

(51) Int. Cl.
*H04W 12/06* (2021.01)
*H04W 4/50* (2018.01)
(Continued)

(52) U.S. Cl.
CPC ............. *H04W 12/06* (2013.01); *H04W 4/50* (2018.02); *H04W 12/63* (2021.01); *H04W 12/69* (2021.01); *H04W 24/10* (2013.01); *H04W 48/18* (2013.01)

(58) Field of Classification Search
CPC ..... H04W 12/06; H04W 12/63; H04W 12/69; H04W 48/18; H04W 8/005; H04W 12/35;
(Continued)

(56) References Cited

U.S. PATENT DOCUMENTS 8,502,686 B2    8/2013  Annunziato et al.
10,027,715 B2   7/2018  Kim et al.
(Continued)

FOREIGN PATENT DOCUMENTS

EP    2071764 A1    6/2009
EP    3632142 A1    4/2020
(Continued)

OTHER PUBLICATIONS

International Search Report and Written Opinion dated Apr. 26, 2022 in corresponding PCT Application No. PCT/KR2022/001120.
(Continued)

*Primary Examiner* — Minh Dinh
(74) *Attorney, Agent, or Firm* — Nixon & Vanderhye, P.C.

(57) ABSTRACT

An electronic device according to various embodiments may include a communication module, and a processor operatively connected to the communication module, wherein the processor is configured to transmit device information of the electronic device to a cloud server or at least one external device located on a local network using the communication module, identify at least one device determined as a provisioning device of an edge computing service from among the electronic device or the at least one external device, receive, based on the electronic device being determined as the provisioning device, authentication information of at least one device, for which the edge computing service is to be provided, from the cloud server the communication
(Continued)

module, and perform provisioning related to the edge computing service based on the authentication information.

20 Claims, 18 Drawing Sheets

(51) Int. Cl.
    *H04W 12/63*     (2021.01)
    *H04W 12/69*     (2021.01)
    *H04W 24/10*     (2009.01)
    *H04W 48/18*     (2009.01)

(58) Field of Classification Search
    CPC .... H04W 4/50; H04W 24/10; H04L 67/1051;
          H04L 67/1057; H04L 67/1072; H04L
          12/2803; H04L 41/30; H04L 41/5054;
          G06F 21/44
    See application file for complete search history.

(56) References Cited

U.S. PATENT DOCUMENTS

| | | | |
|---|---|---|---|
| 10,218,745 B2 | 2/2019 | Na et al. | |
| 10,638,417 B1 | 4/2020 | Baki et al. | |
| 10,735,966 B2 | 8/2020 | Wu et al. | |
| 11,177,951 B2 | 11/2021 | Pauliac et al. | |
| 2004/0100973 A1* | 5/2004 | Prasad | H04L 63/102 |
| | | | 370/401 |
| 2016/0037436 A1 | 2/2016 | Spencer | |
| 2016/0073262 A1 | 3/2016 | Schmidt et al. | |
| 2016/0128043 A1* | 5/2016 | Shuman | H04W 72/044 |
| | | | 370/329 |
| 2017/0142094 A1 | 5/2017 | Doitch et al. | |
| 2017/0272240 A1 | 9/2017 | Bar-el et al. | |
| 2018/0041897 A1 | 2/2018 | Prasad et al. | |
| 2018/0091506 A1 | 3/2018 | Chow | |
| 2018/0343165 A1 | 11/2018 | Anantharaman | |
| 2019/0026450 A1* | 1/2019 | Egner | G06F 21/44 |
| 2020/0177589 A1* | 6/2020 | Mangalvedkar | H04W 4/50 |

FOREIGN PATENT DOCUMENTS

| | | |
|---|---|---|
| KR | 10-2016-0036092 | 4/2016 |
| KR | 10-2016-0142741 | 12/2016 |
| KR | 10-2019-0034317 | 4/2019 |
| KR | 10-2020-0115333 | 10/2020 |
| WO | 2018217326 A1 | 11/2018 |

OTHER PUBLICATIONS

Extended search report dated Mar. 12, 2024 in EP Application No. 22752904.7.

* cited by examiner

ELECTRONIC DEVICE AND METHOD FOR DETERMINING PROVISIONING DEVICE OF EDGE COMPUTING NETWORK

CROSS-REFERENCE TO RELATED APPLICATIONS

This application is a continuation of International Application No. PCT/KR2022/001120 designating the United States, filed on Jan. 21, 2022, in the Korean Intellectual Property Receiving Office and claiming priority to Korean Patent Application No. 10-2021-0019242, filed on Feb. 10, 2021, in the Korean Intellectual Property Office, the disclosures of which are incorporated by reference herein in their entireties.

BACKGROUND

Field

The disclosure relates to Internet of Things (IoT) and, for example, to a method for determining, by an electronic device, a provisioning device to perform a provisioning operation of an edge computing service from among devices located in a local network.

Description of Related Art

Cloud computing is being utilized to process data generated in the Internet of Things (hereinafter, referred to as IoT). In cloud computing, as the amount of data or the number of IoT devices increases, a load may occur on a system, security or privacy issues may occur during data transmission and/or storage, and, if an error occurs in a cloud server or no internet is connected, there may be a problem that a service cannot be provided.

In order to address such a problem of cloud computing, edge computing technology is being used. Edge computing is a form of a distributed computing technology that uses a local edge network to control devices connected within a network and share calculations and resources. In edge computing technology, a response speed may be improved using the edge network for a device requiring a real-time response, and, since calculation is performed within the edge network without transferring a large amount of data to a cloud, network bandwidth may be increased and cloud traffic may be reduced. Further, relevant processing may be performed within the edge network without exposing personal information, and privacy and security may be thus improved.

Registration and management of IoT devices in an edge computing environment may be performed by a cloud server. A cloud server authenticates all connected IoT devices and stores the authentication in a database. Frequent service access for device authentication can cause an increase in cloud server traffic.

SUMMARY

Embodiments of the disclosure may enable a device in a local network to perform a provisioning operation in an edge computing service and, to this end, may provide a method for determining a provisioning device that is to perform a provisioning operation.

An electronic device according to various example embodiments may include: a communication module, and a processor operatively connected to the communication module, wherein the processor is configured to transmit device information of the electronic device to a cloud server or at least one external device included in (or located on) a local network using the communication module, identify at least one device determined as a provisioning device of an edge computing service from among the electronic device or the at least one external device, receive, based on the electronic device being determined to be the provisioning device, authentication information of at least one device, for which the edge computing service is to be provided, from the cloud server using the communication module, and perform provisioning related to the edge computing service based on the authentication information.

A method for determining a provisioning device by an electronic device in an edge computing network according to various example embodiments may include transmitting device information of the electronic device to a cloud server or at least one external device included in (or located on) a local network, identifying at least one device determined as a provisioning device of an edge computing service from among the electronic device or the at least one external device, receiving, based on the electronic device being determined to be the provisioning device, authentication information of at least one device, for which the edge computing service is to be provided, from the cloud server, and performing provisioning related to the edge computing service based on the authentication information.

A server device according to various example embodiments may include a communication interface, a memory, and a processor operatively connected to the communication interface and the memory, wherein the processor is configured to store authentication information of multiple devices in the memory, receive device information from at least one electronic device located on a same local network (as the server device), determine at least one device that is to operate as a provisioning device of an edge computing service from among the at least one electronic device via scoring based on at least one parameter included in the received device information, and transmit at least a part of the authentication information stored in the memory to the provisioning device.

According to various example embodiments of the disclosure, an electronic device and a method for determining a provisioning device in an edge computing network can be provided in which a provisioning device that is to perform a provisioning operation related to an edge computing service can be determined from among devices within a local network and, accordingly, provisioning can be performed on the local network without help of a cloud.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
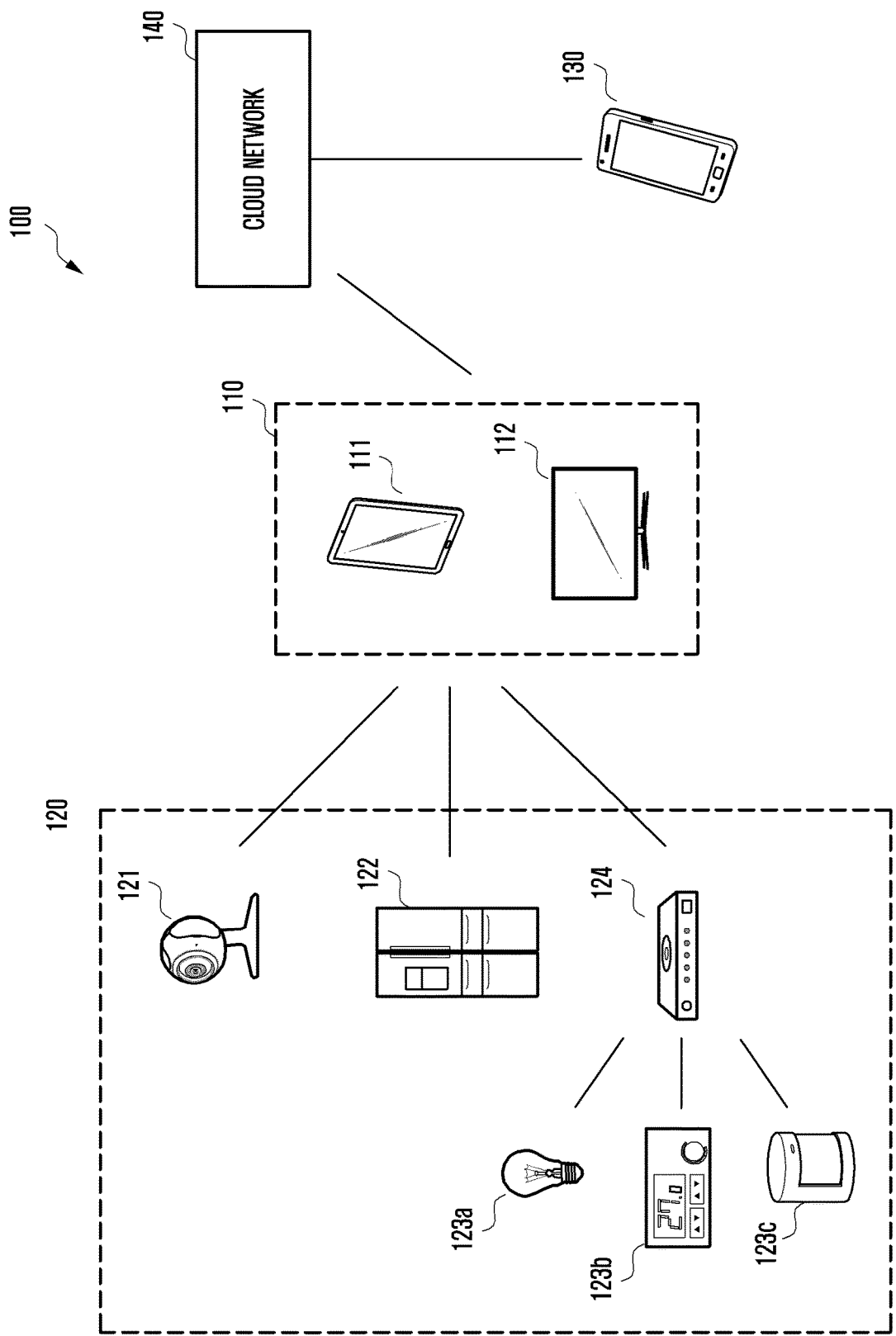
FIG. 1 illustrates devices in an example IoT environment according to various embodiments.

FIG. 1 illustrates devices in an example IoT environment (or IoT system) according to various embodiments.

Referring to FIG. 1, an Internet of Things (IoT) system (or edge computing system) 100 may include at least one leaf device 120, at least one edge device 110, a user device 130, and a cloud network 140. For example, the leaf device 120, the edge device 110, and the user device 130 may be disposed in adjacent locations (e.g., in a house) and connected to the same home network (e.g., same access point (AP)), and the cloud network 140 may be remotely located but may be connected to the leaf device 120, the edge device 110, and the user device 130 via the Internet.

In various embodiments, an edge computing service may, for example, refer to a technology that transmits data acquired from a leaf device to an edge device, which is located adjacent to the leaf device and located on the same home network, and provides a series of data processing and other services on the edge device. In various embodiments, a device (e.g., camera 121, refrigerator 122, light bulb 123*a*, digital thermometer 123*b*, or motion sensor 123*c*) that acquires data via a sensor is referred to as a leaf device, but a leaf device may be referred to by another name, such as a client device, an end device, a sensor device, an IoT device, or a slave device of an edge computing service. In various embodiments, reference is made to an edge device, but an edge device may be referred to by another name, such as an edge server, a server device, a master device, a hub device, or a service device of an edge computing service.

In various example embodiments, the leaf device 120, the edge device 110, and the user device 130 are classified and described according to functions or operations of respective devices within the edge computing system 100, but the same device (e.g., smartphone or tablet PC) may operate as one or more of the leaf device 120, the edge device 110, and the user device 130 in some cases. In other words, names or definitions of devices described in various embodiments do not limit functions and/or operations of the devices.

According to various example embodiments, the leaf device 120, as an end point of the IoT system 100, may collect various data using a sensor and may transmit the collected data to the edge device 110 or the cloud network 140. The leaf device 120 may perform various operations according to a command transferred from the cloud network 140 or the user device 130. Referring to FIG. 1, a device, such as a camera 121, a refrigerator 122, a light bulb 123*a*, a digital thermometer 123*b*, or a motion sensor 123*c*, may be the leaf device 120.

According to various embodiments, the leaf device 120 may access the cloud network 140 through the Internet. A leaf device (e.g., light bulb 123*a* or digital thermometer 123*b*), which does not support the Internet protocol (IP) may transmit sensed data to the hub device 124 via supported non-IP-based communication (e.g., Bluetooth or ZigBee), and the hub device 124 may transmit sensing data of each leaf device 123*a* or 123*b* to the cloud network 140 through the Internet.

According to various embodiments, the cloud network 140 is located on the network and may include various server devices (e.g., an IoT management server or an IoT hub server) that support a cloud computing service in the IoT system 100. The cloud network 140 may perform computing processing on sensing data received from the leaf device 120 and may transmit a command for controlling the leaf device 120.

According to various embodiments, the cloud network 140 may perform an operation and management function to enable a specific device in a home network to operate as the edge device 110. For example, the cloud network 140 may include an IoT server (e.g., an IoT management server or an IoT hub server), and the IoT server may perform an edge computing service, such as registration, connection, or management of the edge device 110 and the leaf device 120, and may provide the edge device 110 with a module (e.g., device module and/or service module) required for the edge computing service.

According to various embodiments, the cloud network 140 may perform a provisioning operation of an edge computing service or a cloud computing service. For example, the cloud network 140 (e.g., an IoT server) may register security information (e.g., X.509, ED25519 key pair and/or public/private key) for each device (e.g., edge device 110 or leaf device 120) on the home network (or local network or edge network), and may authenticate each device based on registered information, and may store authentication-related information in a database. The cloud network 140 may determine whether each device on the home network has access authority to the edge computing service based on information registered in the database during connection to another device or data transmission, may provide software necessary for each device to receive and process data of another device, and may provide a hardware resource on the cloud network if necessary.

According to various embodiments, if at least one device on the home network is determined as a provisioning device, the cloud network 140 may provide the provisioning device with information stored in the database so that the provisioning device may perform a provisioning operation.

According to various embodiments, the edge device 110 may directly process data received from the leaf device 120 or transmit the data to the cloud network 140 (e.g., an IoT server). The edge device 110 may be a device including hardware and/or software resources necessary for an edge computing service, such as a television (TV) 112 and a tablet personal computer (PC) 111. The edge device 110 may be connected to the cloud network 140 through the Internet, and may form a home network with the leaf device 120.

According to various embodiments, multiple edge devices 110 may exist within the home network, and the leaf device 120 may be connected to one of the multiple edge devices 110 so as to transmit data. For example, when a specific leaf device 120 is connected, the edge device 110 may download a module (e.g., device module and/or service module) required for an edge computing service from the cloud network 140 and execute the downloaded module.

According to various embodiments, the edge device 110 may perform a device native function (e.g., an image output function of a TV), and may perform an edge computing service via hardware and/or software resources at least partially concurrently with performing of the native function or during idle time in which the native function is not performed.

According to various embodiments, the user device 130 may provide various user interfaces related to edge computing services via applications. For example, the user device 130 may display, on a display, data (e.g., camera image streaming) acquired from the leaf device 120 or result data (e.g., recognition of person) obtained by processing the data in the edge device 110 or the cloud network 140. The user device 130 may receive an input (e.g., a user input), such as connection of the edge device 110 and/or leaf device 120 or server registration, and may transmit the input to the cloud network 140. A detailed configuration and operation of the user device 130 will be described in more detail below with reference to FIG. 3.

Figure 2A:
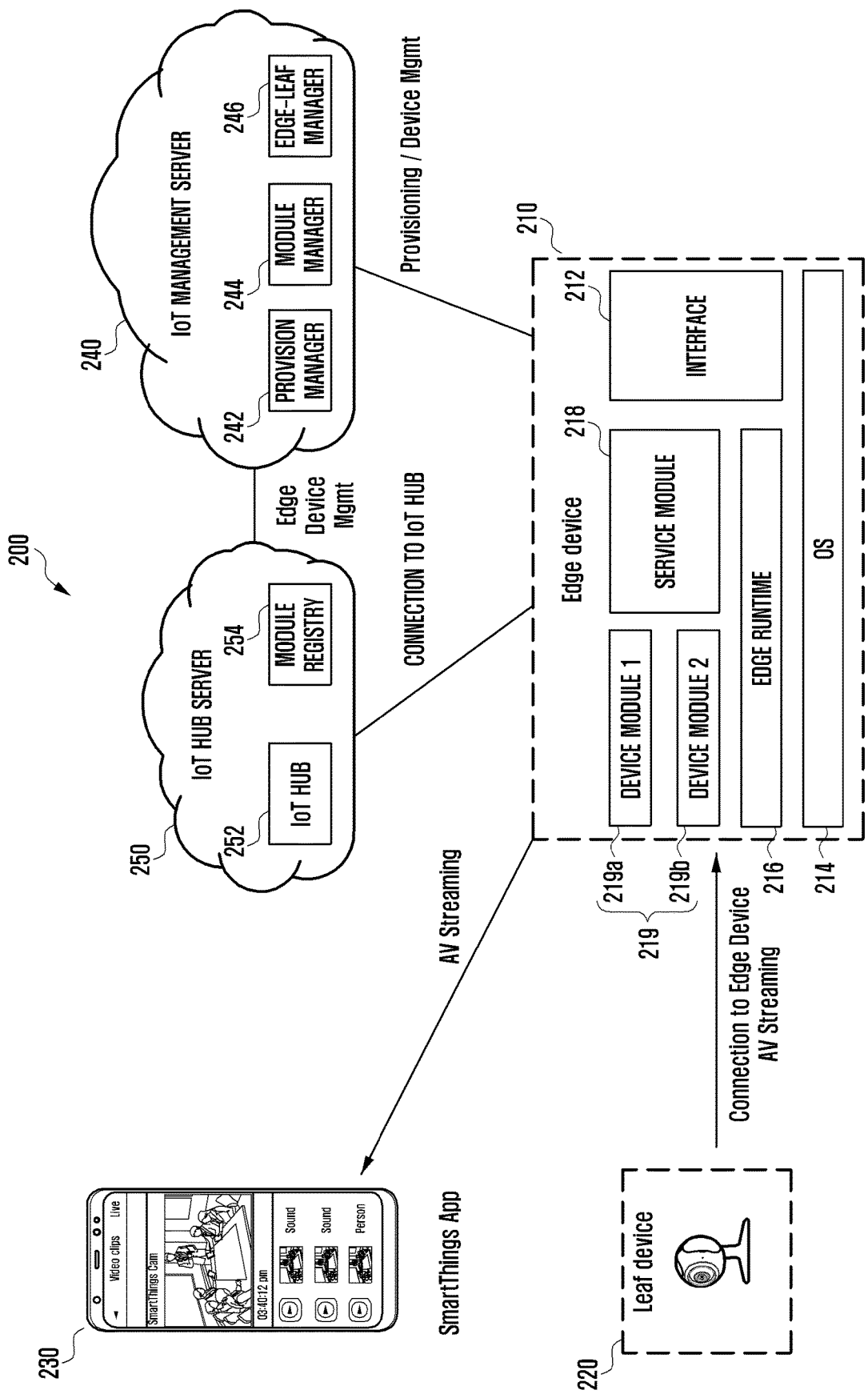
FIG. 2A and FIG. 2B illustrate respective devices of an example edge computing system according to various embodiments.
Figure 2B:
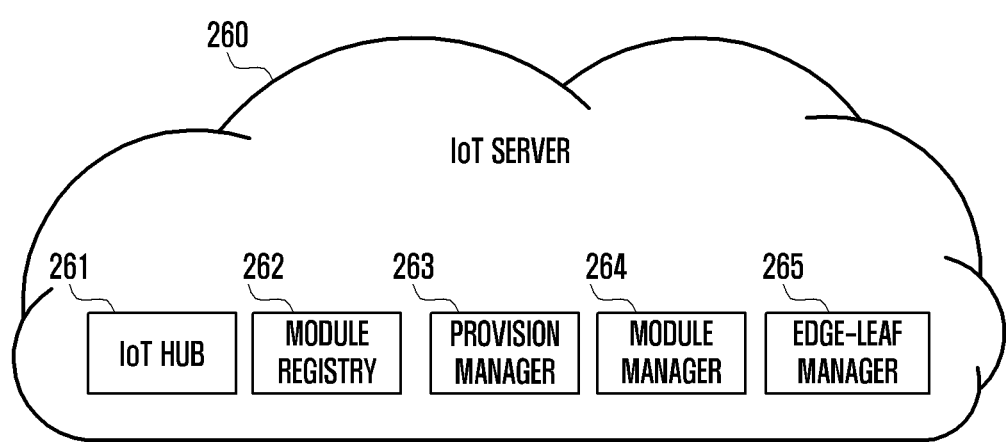

FIG. 2A and FIG. 2B illustrate respective example devices of an edge computing system according to various embodiments.

Referring to FIG. 2A, an edge computing system 200 may include a leaf device 220, an edge device 210, a user device 230, an IoT hub server 250, and an IoT management server 240. As described via FIG. 1, various IoT devices may exist on a home network, and in FIG. 2, one leaf device (e.g., camera 121 of FIG. 1) and one edge device (e.g., TV 112 of FIG. 1) will be described as examples.

According to various embodiments, the IoT management server 240 (e.g., SmartThings™ server) is a server device that provides various services for determining, connecting, and/or operating an edge computing service, and may include a provision manager 242, a module manager 244, and an edge-leaf manager 246.

According to various embodiments, the provision manager 242 may perform a relay function so that the edge device 210 may be connected to the IoT hub server 250. For example, when the edge device 210 is initially registered with the IoT management server 240, the provision manager 242 may transmit, to the edge device 210, a connection string that allows the edge device 210 to be connected to the IoT hub server 250.

According to various embodiments, the module manager 244 may manage information on various modules provided for edge computing services and devices supporting respective services. The modules required to perform edge computing services may include a device module 219 (e.g., device module 1 219a and/or device module 2 219b) that allows the edge device 210 to transmit data transmitted from the leaf device 220 to an external server (e.g., IoT hub server 250) and a service module 218 including programs executed to implement a service in the edge device 210 based on data transmitted from the leaf device 220.

According to various embodiments, the edge-leaf manager 246 may manage a connection state between the edge device 210 and the leaf device 220 existing in multiple home networks. For example, when the edge device 210 and the leaf device 220 registered in the IoT management server 240 are connected or disconnected from each other, the edge device 210 and/or the leaf device 220 may transmit connection or disconnection information to the IoT management server 240, and the IoT management server 240 may store, in real time, information about which edge device 210 and leaf device 220 are connected and which service is being performed.

According to various embodiments, when the leaf device 220 is connected to a specific edge device (e.g., tablet PC 111 of FIG. 1) to perform an edge computing service, and then releases the connection to the corresponding edge device and is connected to another edge device (e.g., TV 112 of FIG. 1) so as to perform an edge computing service according to a handover event, the IoT management server 240 may update connection information between the edge device 210 and the leaf device 240, which is changed according to the handover event.

According to various embodiments, the IoT hub server 250 may support a cloud computing platform and may provide data required for the leaf device 220 and the edge device 210 in the cloud environment to be connected to each other. The IoT hub server 250 may include an IoT hub 252 and a module registry 254.

According to various embodiments, the module registry 254 (module registry) may be a storage of modules (e.g., device module 219 (e.g., device module 1 219a and device module 2 219b) and service module 218) required to perform an edge computing service.

According to various embodiments, the IoT hub 252 may maintain a connection with the edge device 210, may provide a module stored in the module registry 254 to the edge device 210, and may maintain information on modules installed in multiple edge devices 210.

According to various embodiments, the edge device 210 (e.g., edge device 110 of FIG. 1) may be a device having a native device function, such as a TV, a tablet PC, or a laptop PC, and including hardware and/or software configurations (e.g., edge runtime or base module) for an edge computing service. An edge computing service may be performed through hardware and/or software resources at least partially concurrently with performing of the native function or during idle time in which the native function is not performed.

According to various embodiments, the edge device 210 may include an interface 212 for communication with a cloud (e.g., IoT management server 240 and IoT hub server 250), an operating system (OS) 214, an edge runtime 216, the service module 218, and the device module 219 (e.g., device module 1 219a and/or device module 2 219b). For example, the edge device 210 may require a hardware condition (e.g., CPU performance) for operating the operating system 214 and may be configured as a real time operating system (RTOS).

An edge runtime 216 and a basic module for edge computing may be installed in the edge device 210 via software upgrade or a processing procedure of the edge device 210. The edge runtime 216 may include a daemon program for interworking with the IoT server, and the basic module is a program required for communication with the IoT server and may be configured as a container. For example, the basic module may be a container installed in an edge runtime 216 environment.

According to various embodiments, if the edge device 210 is connected to a specific leaf device 220, at least one module for performing an edge computing service may be received from the IoT hub server 250 and installed.

For example, at least one module may be determined according to a type of the connected leaf device 220 and/or a type of service that may be performed, and may include the device module 219 (e.g., device module 1 219*a* or device module 2 219*b*) corresponding to the leaf device 220 and/or the service module 218 corresponding to the type of service to be performed. If the edge device 210 is connected to multiple leaf devices 220, a device module 219 (e.g., device module 1 219*a* and/or device module 2 219*b*) corresponding to each leaf device 220 may be installed. The edge device 210 may be connected to the IoT hub server 250 by execution of the edge runtime 216 during a provisioning procedure, and the at least one module may be additionally installed and executed according to the type of the leaf device 220. The edge device 210 may enable or disable an edge mode according to a command received from the IoT hub server 250 or the IoT management server 240. If the edge mode is disabled, the edge device 210 may perform only a native function (e.g., image output function of TV), and the device module 219 (e.g., device module 1 219*a* and/or device module 2 219*b*) and the service module 218 may not be executed.

According to various embodiments, the leaf device 220 (e.g., leaf device 120 of FIG. 1) may transmit data acquired using a sensor to the connected edge device 210 or cloud network (e.g., IoT management server 240 and/or IoT hub server 250). For example, in a case of an Internet protocol (IP) camera operating as the leaf device 220, the IP camera may be connected to the edge device 210 so as to transmit image streaming to the edge device 210.

According to various embodiments, the user device 230 may be a device, such as a smartphone or a tablet PC, which is capable of executing various applications and includes a display capable of displaying a user interface (UI). The user device 230 may install and/or execute an application for an edge computing service, and may receive a content and notification generated by the leaf device 220 via the corresponding application. If the edge device 210 and the leaf device 220 are connected, the content or notification generated by the leaf device 220 may be transmitted to the user device 230 via the edge device 210.

According to various embodiments, functions of the IoT hub server 250 and IoT management server 240 may be performed by one server device (e.g., IoT server 260 of FIG. 2B). For example, referring to FIG. 2B, the IoT server 260 may include an IoT hub 261 (e.g., IoT hub 252 of FIG. 2A), a module registry 262 (e.g., module registry 254 of FIG. 2A), a provision manager 263 (e.g., provision manager 242 of FIG. 2A), a module manager 264 (e.g., module manager 244 of FIG. 2A) and an edge-leaf manager 265 (e.g., edge-leaf manager 246 of FIG. 2A), which correspond to the aforementioned elements of the IoT hub server 250 and IoT management server 240.

Alternatively, the functions may be performed by three or more multiple server devices. For example, respective elements of the IoT hub server 250 and the IoT management server 240 of FIG. 2A may be distributedly arranged in three or more multiple server devices existing on the network, or some operations performed by respective elements may also be performed distributedly by multiple server devices.

Figure 3:
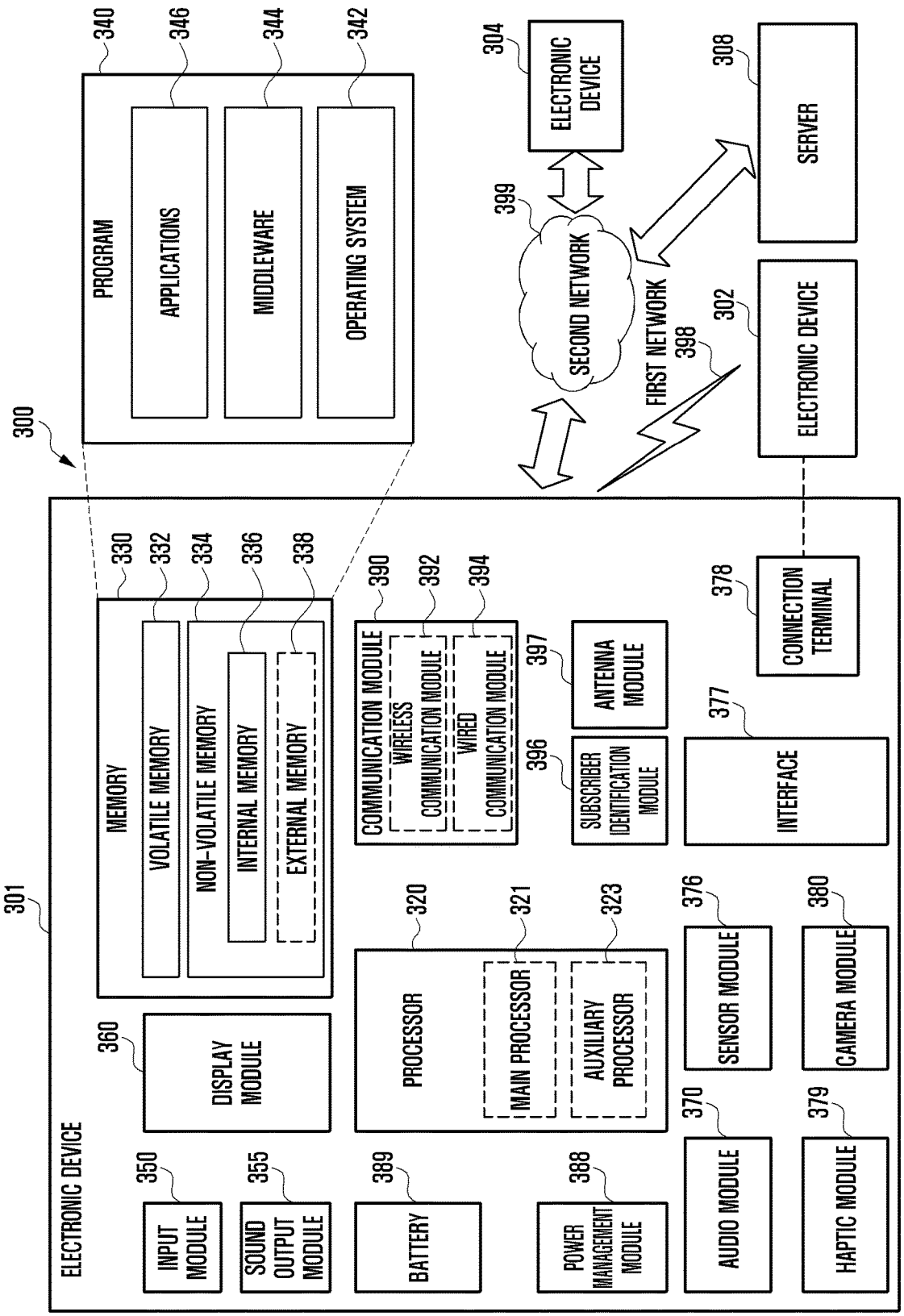
FIG. 3 is a block diagram of an example user device in a network environment according to various embodiments.

FIG. 3 is a block diagram illustrating an example user device in a network environment 300 according to various embodiments. Hereinafter, a user device (e.g., the user device 130 of FIG. 1, and the user device 230 of FIG. 2A) of the edge computing system (e.g., the edge computing system 200 of FIG. 2A) is referred to as an electronic device 301.

Referring to FIG. 3, the user device (or electronic device) 301 in the network environment 300 may communicate with an electronic device 302 via a first network 398 (e.g., a short-range wireless communication network), or at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connection terminal 378, a haptic module 379, a camera module 380, a power management module 388, a battery 389, a communication module 390, a subscriber identification module (SIM) 396, or an antenna module 397. In various embodiments, at least one of the components (e.g., the connection terminal 378) may be omitted from the electronic device 301, or one or more other components may be added in the electronic device 301. In various embodiments, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to an embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of, the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include a touch sensor adapted to detect a touch, or a pressure sensor adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connection terminal 378 may include a connector via which the electronic device 301 may be physically connected with the external electronic device (e.g., the electronic device 302). According to an embodiment, the connection terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to an embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399

(e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element including a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In an embodiment, the external electronic device 304 may include an internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

According to various embodiments, the processor 320 may perform control related to an edge computing service using an edge device (e.g., edge device 210 of FIG. 2A) and a leaf device (e.g., leaf device 220 of FIG. 2A) within the home network by means of the application 346.

According to various embodiments, the application 346 may provide a function of registering the edge device and the leaf device with an IoT server (e.g., IoT management server 240 of FIG. 2A). For example, the processor 320 may, using the communication module 390, discover at least one edge device and leaf device within the home network and receive device information (e.g., identification information and network information) of each device.

The processor 320 may control the display module 360 to display a list of identified devices on the application. The processor 320 may request registration by controlling the communication module 390 to transmit, to the IoT server, device information of the edge device or leaf device selected based on a user input. The processor 320 may receive a name, location information, and/or like of each device from the application 346.

According to various embodiments, when an edge mode of the edge device is disabled, the processor 320 may receive, from a cloud network, data (e.g., image streaming and sound data) which is acquired by the sensor of the leaf device from the leaf device. Thereafter, when an edge computing service is initiated, the data acquired from the leaf device may be transmitted to the edge device, and a user device (e.g., user device 130 of FIG. 1, user device 230 of FIG. 2A, or electronic device 301) may receive sensor data and analysis data directly from the edge device or may receive the same via a cloud network (e.g., cloud network 140 of FIG. 1) from the edge device.

According to various embodiments, the processor 320 may display information related to connection or disconnection between the edge device and the leaf device on an application displayed on the display.

According to various embodiments, at least one of elements (components) of the edge device or the leaf device may be configured to be at least partially identical to or similar to elements (components) of the electronic device 301 (e.g., user device). For example, the sensor of the leaf device may perform substantially the same function and/or operation as the sensor module 376 of the electronic device 301.

Figure 4:
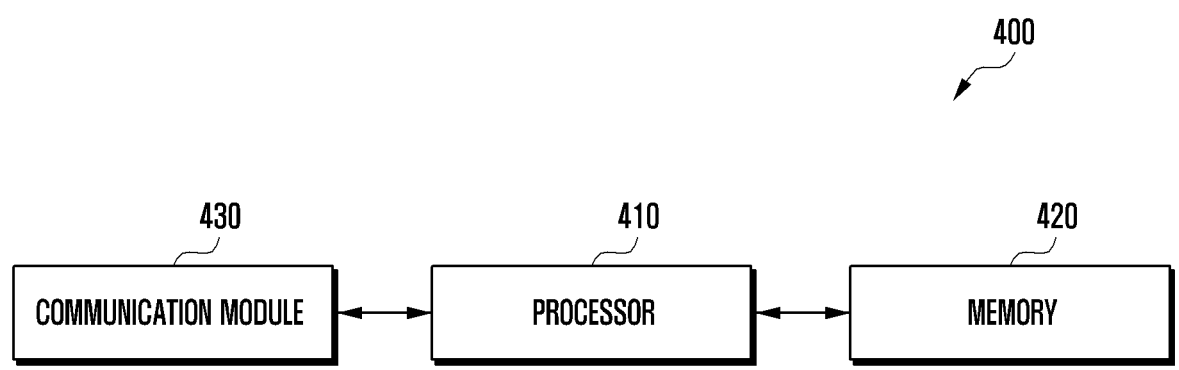
FIG. 4 is a block diagram of an example electronic device according to various embodiments.

FIG. 4 is a block diagram of an example electronic device according to various embodiments.

Referring to FIG. 4, the electronic device 400 may include a processor 410, a communication module 430, and a memory 420, and may implement various embodiments even if some of the illustrated elements are omitted or substituted.

According to various embodiments, the electronic device 400 may be implemented as one device on an IoT system (or edge computing system). For example, the electronic device 400 may be a device having one or more processors and/or memory resources from among an edge device (or hub device) (e.g., Tablet PC 111 or TV 112 of FIG. 1) or a leaf device (e.g., camera 121, refrigerator 122, light bulb 123a, digital thermometer 123b, or motion sensor 123c of FIG. 1) of the IoT system. The electronic device 400 may perform a native function (e.g., outputting an image by a TV or executing an application by a tablet PC), may perform an operation for selecting a provisioning device, which will be described below, while the native function is not being executed or at least partially concurrently with executions of the native function, and/or may perform a provisioning operation when selected as a provisioning device.

Hereinafter, described are various embodiments in which the electronic device 400 performs an operation for determining, as a provisioning device, at least one device among multiple devices including the electronic device 400 in an edge computing environment, and a provisioning operation in the edge computing environment, if the electronic device 400 is selected as a provisioning device.

According to various embodiments, the communication module 430 (including, e.g., communication circuitry) may support wireless communication (e.g., Wi-Fi and cellular communication) and may transmit or receive data to or from another electronic device 400 (or external device) or a cloud server of the IoT system. The communication module 430 may communicate with an external device via an access point (AP) or may directly communicate with another device using P2P (e.g., Wi-Fi Direct or Wi-Fi Aware) communication.

According to various embodiments, the memory 420 may include a volatile memory and a non-volatile memory, and may temporarily or permanently store various data used in at least one element (e.g., processor 410) of the electronic device 400. The memory 420 may store various instructions that may be executed by the processor 410. The instructions may include various control commands including arithmetic and logical operations, data movement, or input/output which are recognizable by the processor 410.

According to various embodiments, the processor 410 is an element capable of performing operations or data processing related to control and/or communication of respective elements of the electronic device 400, and may be operatively, functionally, and/or electrically connected to respective elements of the electronic device 400, such as the communication module 430 or the memory 420.

According to various embodiments, the processor 410 is not limited to arithmetic and data processing functions that may be implemented within the electronic device 400. Hereinafter, detailed descriptions will be provided with respect to an operation for determining, as a provisioning device, at least one device among multiple devices, including the electronic device 400, in an edge computing environment and operations performed by the processor 410 in various embodiments of performing a provisioning operation in the edge computing environment, if the electronic device 400 is selected as a provisioning device.

According to various embodiments, the processor 410 may determine at least one device to operate as a provisioning device for an edge computing service. For example, at least one device among multiple devices, including the electronic device 400, within a local network (or home network) (e.g., first network 398) may be determined as a provisioning device. For example, the local network includes a Wi-Fi network, and multiple devices within the local network may be connected to each other via a Wi-Fi access point.

According to various embodiments, if one device within the local network is determined as a provisioning device, the provisioning device of the local network may perform a provisioning operation provided by a cloud server of a cloud computing service. Here, the provisioning operation may include registering security information (e.g., X.509, ED25519 key pair and/or public/private key) for each device for the edge computing service, and authenticating each device based on the registered information. The provisioning device may synchronize authentication information stored in a database of the cloud server, may store the same in the memory 420 of the provisioning device, and may perform a provisioning operation for each device on the local network.

According to various embodiments, a procedure of determining the provisioning device may be performed by a device (e.g., electronic device 400) on the home network or by the cloud server.

According to various embodiments, the processor 410 may identify device information of electronic device 400 and receive device information of at least one external device existing in the local network using the communication module 430. Here, the device information may include a security parameter, a performance parameter, and/or a utility parameter.

According to various embodiments, the security parameter may include parameters related to a current security state of the device, such as whether the device is equipped with a trust zone or an embedded secure element (eSE), whether rooting (or developer mode) is running, or whether a security program (e.g., anti-virus) is running.

According to various embodiments, the performance parameter may include a parameter, such as maximum performance of the processor and/or memory of the device and/or capacity of currently available resources or a battery state of the device.

According to various embodiments, utility information may be determined according to a hop count to a gateway and/or a role (e.g., gateway device, edge device, or leaf device) of the device in the edge computing service.

According to various embodiments, the processor of the device may identify device information of the device and may transmit the device information of the device to each other device in the local network.

According to various embodiments, the processor 410 may determine (or identify) a provisioning device, based on the device information of the electronic device 400 and device information of an external device, which is received from each external device. According to various embodiments, the processor 410 may determine a provisioning device via scoring based on a parameter of each device. The processor 410 may give each of weight or score to the security parameter, the performance parameter, or the utility parameter of device information during scoring, and may give a highest weight to the security parameter.

According to various embodiments, the processor 410 may identify multiple devices capable of operating as a provisioning device from among devices in the local network, and may determine a provisioning device using device information of the identified multiple devices. For example, if a type of a device among multiple devices corresponds to a determined type (e.g., TV, camera, hub device, laptop PC, or tablet PC), the device may be a candidate for a provisioning device. The processor 410 may transmit device information of the electronic device 400 and/or may request device information from a device that may be a candidate for a provisioning device based on a discovery procedure or type information of each device received from the cloud server.

Non-limiting example procedures of selecting a provisioning device by the electronic device 400 via scoring of device information will be described in more detail with reference to FIG. 6 to FIG. 12.

According to an embodiment, the electronic device 400 may receive information on the selected provisioning device from the cloud server. For example, the cloud server may receive device information of each device in the local network so as to determine at least one provisioning device of the corresponding local network via scoring, and may transmit information of the determined provisioning device to the provisioning device or to all devices in the local network.

According to various embodiments, multiple devices on the local network may be determined as provisioning devices. For example, the electronic device 400 or the cloud server may determine the number of provisioning devices to be selected on the local network, based on at least a part of the number of devices located on the local network, a maximum hop count, or a configuration of a user device. If multiple devices are determined as provisioning devices, a first provisioning device may perform provisioning for some of multiple devices in the local network, and a second provisioning device may perform provisioning for the others.

According to various embodiments, if a new device is connected to the local network or there is a change in scores, the electronic device 400 or the cloud server may reselect at least some of the predetermined provisioning devices. Alternatively, if a provisioning operation of a provisioning device is stopped, if malfunction or theft occurs, if another provisioning device does not receive secure communication, or if provisioning data of the provisioning device is deleted, a provisioning device may be determined again via a scoring operation.

Hereinafter, an operation of a case in which the electronic device 400 is determined as a provisioning device will be described.

According to various embodiments, if the electronic device 400 is determined as a provisioning device, the processor 410 may receive authentication information of at least one device on the local network, which is to provide an edge computing service, from the cloud server using the communication module 430.

According to an embodiment, the processor 410 may receive authentication information of at least one device registered using the same account on the cloud server. For example, when the device is on-boarded in the cloud server, registration may be performed based on an account on the user device. The cloud server may store authentication information of each device based on an account used during registration, and may provide the electronic device 400 with authentication information of a device registered using the same account as that of the electronic device 400 selected as a provisioning device in the local network.

According to an embodiment, the processor 410 may receive authentication information of at least one electronic device registered for the same location as the electronic device 400 in the cloud server. For example, when the device is on-boarded in the cloud server, a location ID and space information (e.g., room, living room, or outdoor) may be registered. The cloud server may store authentication information of each device based on a location configured by a user during registration, and may provide the electronic device 400 with authentication information of a device registered for the same location as the electronic device 400 selected as a provisioning device in the corresponding local network.

According to an embodiment, the processor 410 may receive, from the cloud server, authentication information of a device selected by the user in an application of the user device. For example, if a device is on-boarded in the cloud server using the user device, an object (e.g., card) indicating the on-boarded device is generated in the application of the user device, wherein the object may include a device ID. The cloud server may transmit, to a provisioning device, authentication information of a device included in a list of objects registered from the user device and a list of connected device IDs.

According to an embodiment, the processor 410 may dynamically discover respective devices in the local network via device discovery, may transmit a device list of discovered devices to the cloud server, and may receive authentication information of the corresponding devices.

Figure 5:
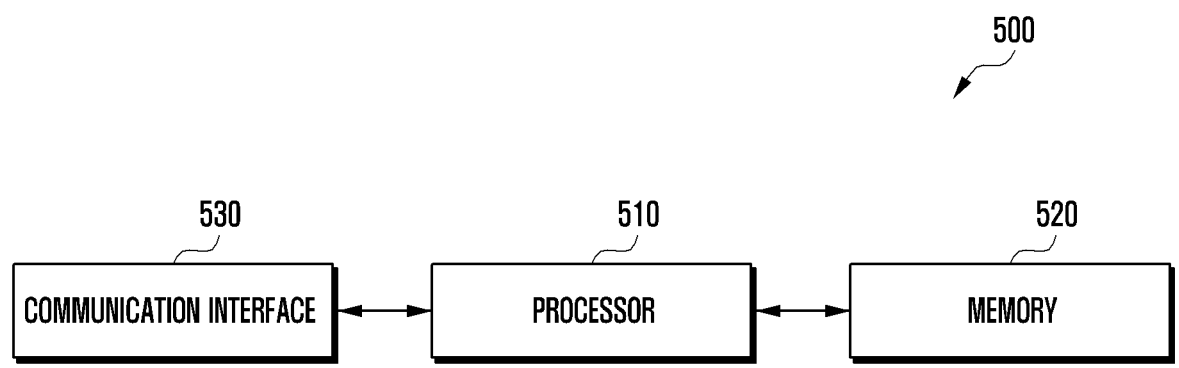
FIG. 5 is a block diagram of an example cloud server according to various embodiments.

FIG. 5 is a block diagram of an example cloud server according to various embodiments.

According to various embodiments, the cloud server 500 is a server device located on a cloud network (e.g., cloud network 140 of FIG. 1) and may be implemented as one or more server devices.

Referring to FIG. 5, a cloud server 500 may include a processor 510, a communication interface 530, and a memory 520, and may implement various embodiments even if some of the illustrated elements are omitted or substituted.

According to various embodiments, the communication interface 530 may transmit or receive data to or from each device (e.g., edge device 110, leaf device 120, and/or user device 130 of FIG. 1) of a local network via PDN (Packet Data Network).

According to various embodiments, the memory 520 may store various information related to a cloud computing service. For example, the cloud server 500 may store authentication information of each device on-boarded via a user device in a database on the memory 520, based on a registration account, location, or configuration of the user device.

According to various embodiments, the processor 510 may perform provisioning operations of a cloud computing service and/or an edge computing service. For example, the cloud server 500 may store security information (e.g., X.509, ED25519 key pair, or public/private key) for each device on the local network in the database of the memory 520, and may authenticate each device on the basis of registered information.

According to various embodiments, the processor 510 may determine whether each device on the local network has access authority to an edge computing service based on information registered in the database during connection to another device or data transmission, may provide software necessary for each device to receive and process data of another device, and may provide a hardware resource on the cloud server 500 if necessary.

According to various embodiments, the processor 510 may determine a provisioning device for an edge computing service on a specific local network. A method of determining a provisioning device by the processor 510 may be at least partially the same as the method of determining a provisioning device by the processor 410 of the electronic device, which has been described above with reference to FIG. 4.

According to various embodiments, the processor 510 may receive device information of multiple external devices existing in the local network via the communication interface 530. Here, the device information may include a security parameter, a performance parameter, and/or a utility parameter. The processor 510 may determine a provisioning device via scoring based on a parameter of each device. The processor 510 may give each of weight or score to the security parameter, the performance parameter, or the utility parameter of device information during scoring, and may give a highest weight to the security parameter.

According to various embodiments, the processor 510 may transmit, via the communication interface 530, information of a selected provisioning device to at least one device determined as the provisioning device or to all devices in the local network.

According to an embodiment, an operation of selecting a provisioning device may be performed by each device on the local network, and in this case, the cloud server 500 may receive information on a selected provisioning device from at least one device on the local network.

According to various embodiments, if at least one device in the local network is determined as a provisioning device, the processor 510 may provide authentication information stored in the database of the memory 520 to the provisioning device via the communication interface 530 so that the provisioning device may perform a provisioning operation.

According to various embodiments, the processor 510 may provide a provisioning device with authentication information of at least one device registered using the same account as that of the provisioning device, may provide authentication information of at least one electronic device registered for the same location, and/or may provide authentication information of a device selected by a user in an application of a user device.

Figure 6:
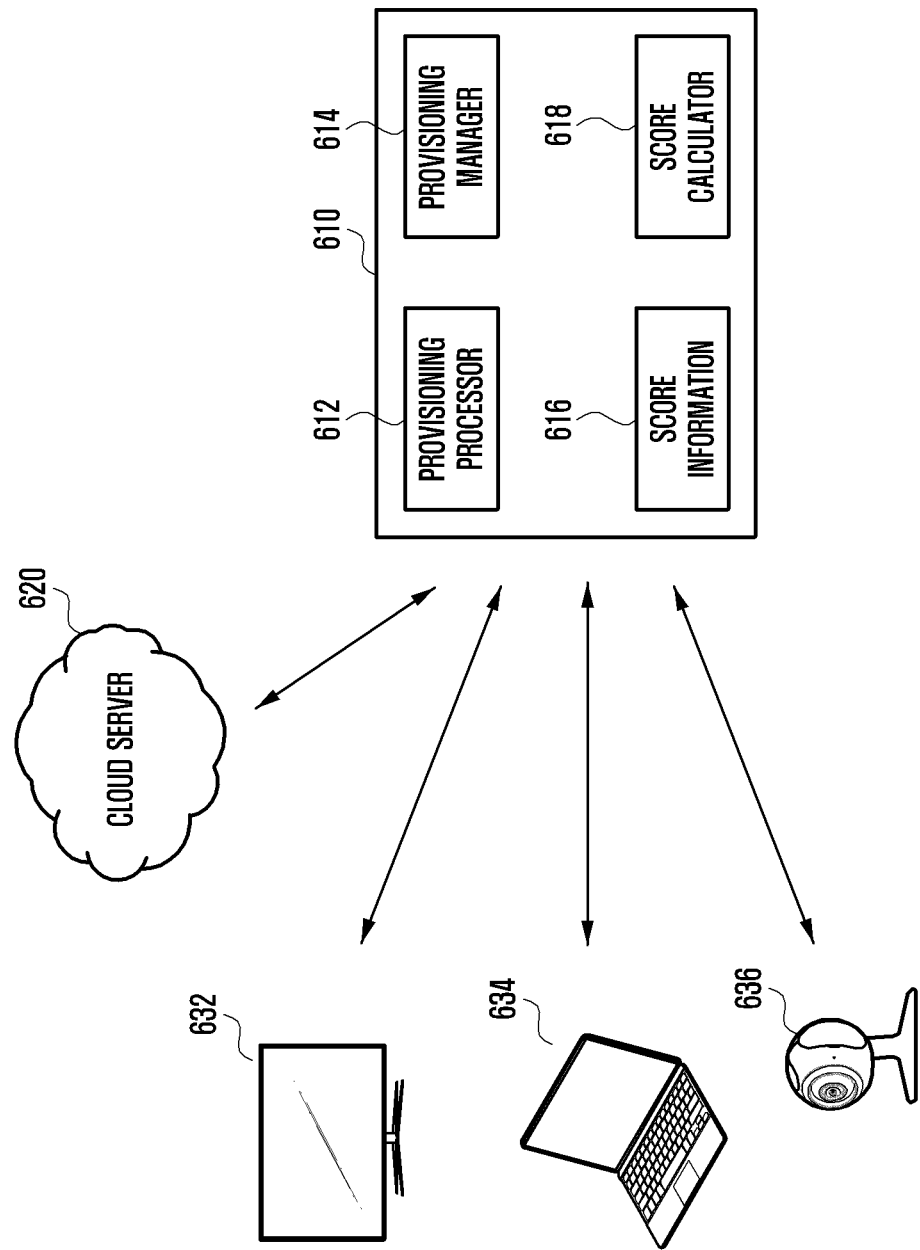
FIG. 6 illustrates an example configuration of an electronic device for determining a provisioning device according to various embodiments.

FIG. 6 illustrates a configuration of an electronic device for determining a provisioning device according to various embodiments.

Referring to FIG. 6, in an electronic device 610 (e.g., electronic device 400 of FIG. 4), a provisioning processor 612, a provisioning manager 614, score information 616, and a score calculator 618 may be used to determine a provisioning device. The illustrated configuration may include at least a part of a configuration of a processor (e.g., processor 410 of FIG. 4) or may be a program executable by the processor or information stored in a memory.

According to various embodiments, the electronic device 610 may receive device information from at least one external device (e.g., TV 632, laptop PC 634, or IP camera 636) existing in a local network and may store the received device information in the score information 616. Here, the device information may include a security parameter, a performance parameter, and/or a utility parameter. The electronic device 610 may store device information of the electronic device 610 in the score information 616.

According to various embodiments, the score calculator 618 may calculate a score of each device by calculating each parameter of device information according to a determined algorithm. For example, the score calculator 618 may assign each of weight or score to a security parameter, a performance parameter, or a utility parameter of device information, and may determine, as a score of a corresponding device, the sum of scores calculated from each parameter. In this case, the score calculator 618 may assign high weights in the order of the security parameter, the performance parameter, and the utility parameter among respective parameters, and the parameters may have threshold values respectively.

Table 1 shows an example of a method of calculating a score using each parameter of device information by the electronic device 610.

TABLE 1

| Parameters | Targets | Descriptions |
| --- | --- | --- |
| Security | Trust zone/ eSE (embedded secure element) | Hardware security level e.g., +500 points, if a reliable file system, such as a trust zone, exists |
| | Rooting | Software security level e.g., −200 points, if a rooting or developer mode is enabled |
| | Anti-virus | Software security level e.g., +200 points each, when a security program, a firewall, and other security devices are used (up to 400 points) |
| | Others | Other security levels e.g., +50 points when user authentication and edge device authentication are performed (up to 200 points) |
| Performance | Max CPU or memory | Hardware performance (up to 40 points) e.g., +20 points for having a processor with a specific performance or higher, +20 points for having a memory with a specific capacity or higher |
| | Available CPU or memory | Available hardware resources (up to 40 points) e.g., +20 points if an average CPU occupancy rate and a current CPU occupancy rate are equal to or lower than 50%, +10 points if each of average free memory and current free memory has a value equal to or greater than a specific value |
| | Battery | Possible operation time (up to 10 points) |

TABLE 1-continued

| Parameters | Targets | Descriptions |
| --- | --- | --- |
| | | e.g., +10 points for a device connected to a power source, +10 points if a battery with a specific capacity or higher is in use and the remaining capacity is equal to or higher than a specific percentage |
| Utility | Connectivity | Hop count to gateway, and maximum hop count |
| | role | Whether operating as a gateway or an edge device |

According to various embodiments, the provisioning manager 614 may select at least one provisioning device, based on a score of each device calculated by the score calculator 618.

The provisioning manager 614 may classify each device by provisioning level according to a scoring result of each device, and each provisioning level may be classified according to whether it is possible to operate as a provisioning device in a specific situation. Table 2 is an example of classification of provisioning levels of respective devices according to scoring results.

TABLE 2

| Provisioning level | Descriptions |
| --- | --- |
| Level 1 | Provisioning can be performed only for insensitive devices by means of only minimal functionality without additional security measures e.g., device with a score of 100 or higher |
| Level 2 | Non-rooted device which has the same security means as a basic security program, in spite of having no strong security means as a trust zone. Provisioning can be performed up to devices of an intermediate security level. e.g., device with a score of 300 or higher |
| Level 3 | If an assured security means, such as a trust zone, is provided and hardware/software performance of a specific level or higher is guaranteed, a provisioning operation at the same level as that of the cloud server 620 can be performed. e.g., device with a score of 600 or higher |

Examples of a scoring method of the provisioning manager 614 and/or the score calculator and a level classification method of a provisioning device may be given as follows.

According to an embodiment, the provisioning manager 614 may select a scoring method for a specific device or all devices of a local network device in consideration of a security level and a provisioning level.

For example, a score of a device may be determined as in Equation 1 below.

$$\text{Score} = \text{security level} \cdot \text{weight 1} + \text{performance} \cdot \text{weight 2} + \text{position} \quad \text{[Equation 1]}$$

Here, weight 1 may be higher than weight 2. (e.g., weight 1=100, weight 2=10)

The provisioning manager 614 may configure or omit a weight during configuration of a basic score. When score configuration is performed by applying a weight in advance, each parameter value may be added without having to consider the weight.

According to an embodiment, when a specific device is selected as a provisioning device, a specific score may be added to a score of the device so as to adjust the device to have a higher score than other devices. Alternatively, if a specific device performs a provisioning operation, the device may be adjusted to have a higher score by adding, to a score of the device, a value obtained by multiplying a third weight (e.g., 1000) by a provisioning level. Accordingly, a difference between a score of at least one device selected as a provisioning device and calculated scores of remaining devices that are not selected as a provisioning device may have a large value. According to an embodiment, if a specific device is selected as a provisioning device, a score of the device may be adjusted, and the adjusted score may be transmitted (e.g., broadcasted) to neighboring devices so as to inform that the device operates as a provisioning device.

According to an embodiment, if a new device is connected to the local network, the provisioning manager 614 may determine whether the device is a current provisioning device and/or may check a provisioning level, based on device information received from the device. For example, if performed in an edge network, a specific device in the edge network may identify that a new device has entered, and in a case of a server, it may be identified that onboarding or joining or rejoining in the network has been performed based on an account. When connection of the new device is identified, the provisioning manager 614 may use an existing score value received from the device or calculated before reconnection, or the score calculator 618 may recalculate a score and a provisioning level value via the procedure.

According to various embodiments, if the electronic device 610 is determined as a provisioning device, the provisioning processor 612 may perform a provisioning operation. For example, the provisioning processor 612 may receive authentication information of each device from the cloud server 620, may store the same in a memory, and may perform a provisioning operation.

Figure 7:
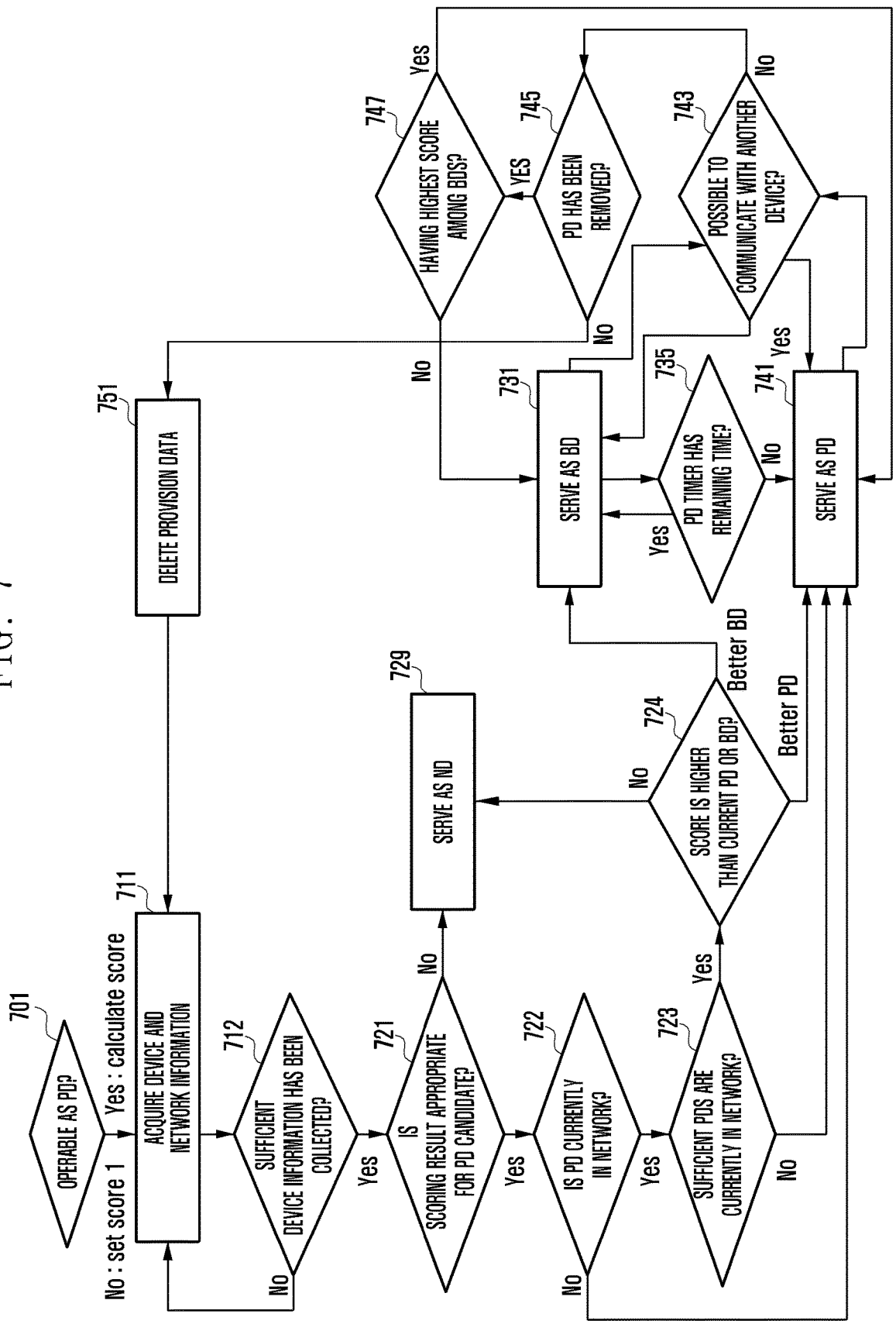
FIG. 7 is a flowchart of an example method for determining a provisioning device according to various embodiments.

FIG. 7 is a flowchart of an example method for determining a provisioning device according to various embodiments.

The method illustrated in FIG. 7 may be performed by each device (e.g., electronic device 400 of FIG. 4 or electronic device 600 of FIG. 6) on a local network. In FIG. 7, PD may refer to a provisioning device, BD may refer to a backup device capable of preliminarily operating as a provisioning device, and ND may refer to a non-provisioning device that cannot perform a provisioning operation.

According to various embodiments, a timing of selecting a provisioning device may be determined as follows.

According to an embodiment, a provisioning device of the local network may be determined by a trigger of a user device. Since a provisioning device has a security issue, a provisioning device may operate only when a user directly requests selection of a provisioning device via the user device. Even before a trigger of the user, each device in the local network may calculate a score of itself and may exchange the pre-calculated score with other nearby nodes, thereby reducing time for selecting a provisioning device.

If the user enables a function of selecting a provisioning device, fundamentally all networks (e.g., local network registered via a user account) managed by the user may select a provisioning device and perform a provisioning operation on a local basis. Since a provisioning device fundamentally operates based on the local network, an unconnected network (e.g., another local network) may go through a separate provisioning device selection procedure. When the user enables the function of selecting a provisioning device, the user may increase a degree of freedom by enabling separate selection of devices that may be candidates. A cloud server may transfer a user input to each device on the local network so as to initiate selection of a provisioning device. According to an embodiment, if the user enables the function of selecting a provisioning device, the cloud server may initiate selection of a provisioning device only for devices capable of performing a provisioning operation. If an operation of selecting a provisioning device starts, each device may perform a score update with neighboring devices for a determined time (e.g., 1 minute to 10 minutes). If there is no update for a specific period of time, a provisioning device may be selected according to a procedure for selecting a provisioning device thereafter.

Hereinafter, an operation of an electronic device (e.g., electronic device 400 of FIG. 4 or electronic device 600 of FIG. 6) when selection of a provisioning device is triggered will be described with reference to FIG. 7.

According to various embodiments, in operation 701, an electronic device may determine whether the electronic device is able to operate as a provisioning device (PD) and/or a backup device (BD). For example, if a type of a device among multiple devices corresponds to a determined type (e.g., device type, such as a TV, a camera, a hub device, a laptop PC, or a tablet PC), the device may be a candidate for a provisioning device. As a result of the determination, if the electronic device is unable to operate as a PD, a score may be configured to a low value (e.g., 1) so that the electronic device cannot be selected as a provisioning device, and if the electronic device is able to operate as a PD, a score calculation operation that will be described later may be performed.

The score of the electronic device may be calculated using parameters (e.g., security parameter, performance parameter, and/or utility parameter) of device information of the electronic device.

According to various embodiments, in operation 711, the electronic device may acquire network information and device information of the electronic device. For example, the device information may include a security parameter, a performance parameter, and/or a utility parameter, and the network information may include information, such as a hop count and/or an IP address from a specific device (e.g., gateway and AP).

According to various embodiments, in operation 712, the electronic device may determine whether sufficient device information and network information for calculating a score of the electronic device have been collected. According to an embodiment, the electronic device may request information on a network including the electronic device and device information of devices included in the network from a cloud server (e.g., cloud server 140 of FIG. 1 or cloud server 620 of FIG. 6). According to an embodiment, the electronic device may collect device information and network information from external electronic devices located in a specified range for a specified time using a short-range network. The electronic device may acquire device information and network information until sufficient information is collected.

According to various embodiments, in operation 721, when sufficient information is collected, the electronic device may calculate a score of the electronic device based on each parameter, and may determine whether the score of the electronic device is appropriate for a PD candidate.

According to various embodiments, if the electronic device cannot be a PD candidate due to a result of the scoring, the electronic device may be determined as a non-provisioning device (ND) in operation 729. For example, if the scoring result of the electronic device is lower than a scoring result of another electronic device, which is calculated by the electronic device, the electronic device may determine that the electronic device cannot be a PD candidate.

According to various embodiments, if the electronic device is able to be a PD candidate as the result of the scoring, the electronic device may determine in operation 722 whether there is a PD currently performing a provisioning operation in the local network. If there is no PD in the local network currently, the electronic device may be determined to be a PD so as to serve as the PD in operation 741.

According to various embodiments, if there are PDs currently performing a provisioning operation in the local network, the electronic device may determine in operation 723 whether there are a sufficient number of PDs in the local network. For example, the electronic device may determine whether the number of PDs is sufficient in consideration of a difference (or ratio) between the number of devices currently located in the local network and the number of PDs, and/or a maximum value of an end to end hop count of the local network.

According to various embodiments, if there are a sufficient number of PDs in the local network, the electronic device may determine in operation 724 whether the score of the electronic device is higher than scores of the currently operating PDs or backup devices (BDs). As a result of the determination, if the score of the electronic device is not high, the electronic device may be determined as an ND in operation 729.

According to various embodiments, if the score of the electronic device is higher than a score of a current PD, the electronic device may serve as a PD in operation 741, and if the score of the electronic device is lower than a score of a current PD and higher than a score of current BD, the electronic device may serve as a BD in operation 731.

According to various embodiments, if the electronic device serves as a BD, the electronic device may determine in operation 735 whether another device serving as a PD has remaining time to serve as the PD, and the electronic device may change its role to be a PD when the remaining time is over.

According to various embodiments, the electronic device may determine in operation 743 whether the electronic device is able to communicate with another device in the network while operating as a provisioning device, and if communication is possible, the electronic device may continue serving as a PD, and if communication is not possible, the electronic device may determine in operation 745 whether another device serving as a PD of the local network has departed or been removed from the network.

According to various embodiments, if another device serving as a PD is removed, whether the electronic device has a highest score among BDs is determined in operation 747, and, if the electronic device has the highest score among the BDs, the electronic device may serve as a PD and may serve as a BD otherwise.

According to various embodiments, if a result of the determination in operation 745 indicates that another device in the local network continues operating as a PD, the electronic device may delete stored provisioning data in operation 751. After deletion of the provision data, if the PD selection procedure starts again, a scoring operation based on device information may be performed.

According to various embodiments, if operation 735 indicates that time for serving as a PD for another device serving as a PD has expired, whether there is a PD in the current network may be determined. For example, if the device serving as the PD departs or is removed from the network (e.g., moving to outside or disconnection from the network), the device having served as a BD may perform a PD role. As another example, if the device serving as a PD is in the network, the device serving as the PD may update a PD timer so as to serve as the PD.

Figure 8:
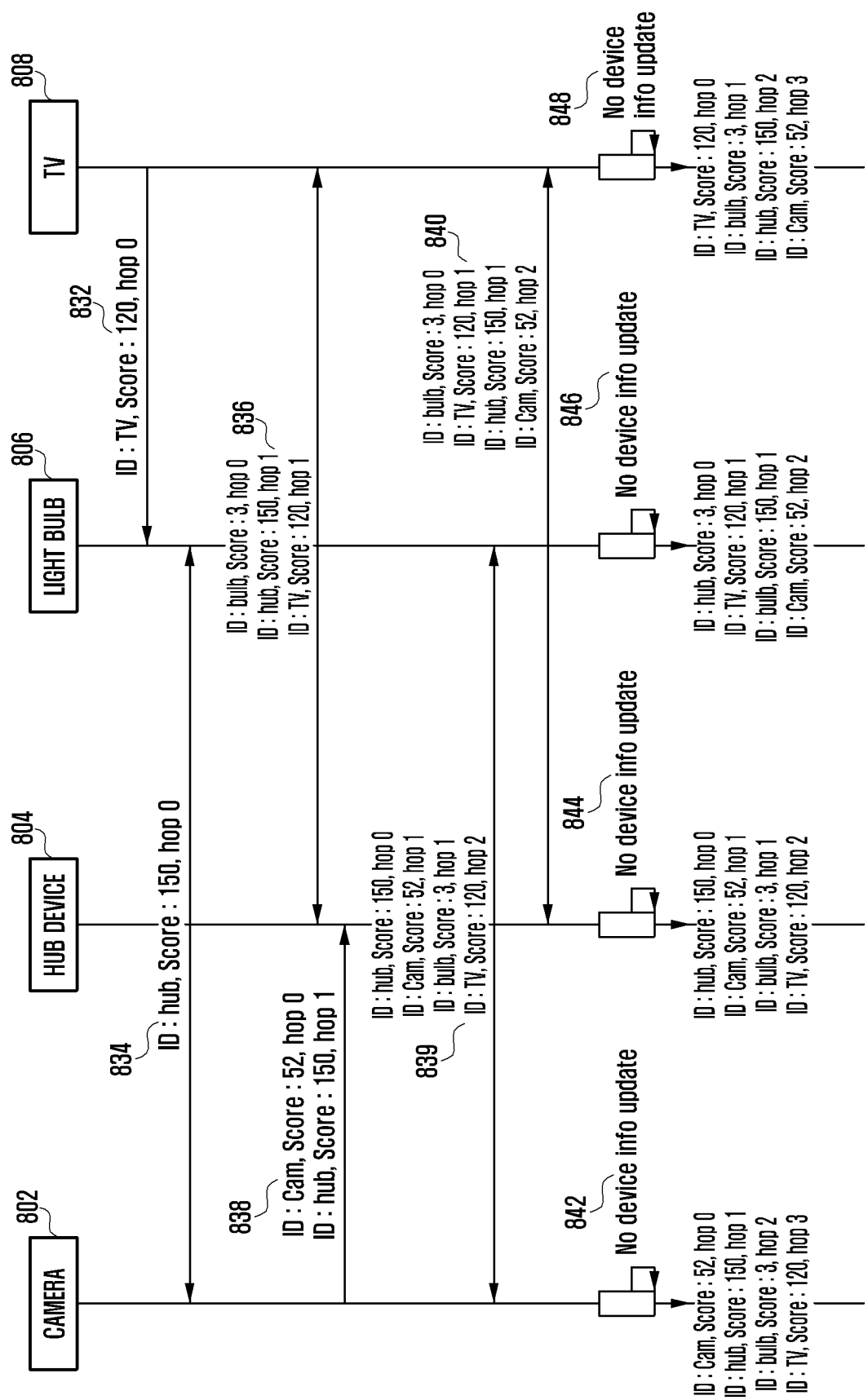
FIG. 8 is a signal flow diagram illustrating an example of determining a provisioning device via scoring of each device according to various embodiments.

FIG. 8 is a signal flow diagram of an example of determining a provisioning device via scoring of each device according to various embodiments.

Referring to FIG. 8, a camera 802, a hub device 804, a light bulb 806, and a TV 808 are located on a local network, wherein the camera 802 may be connected to the hub device 804 so as to transmit or receive device information, the hub device 804 may be connected to the camera 802 and the light bulb 806 so as to transmit or receive device information, the light bulb 806 may be connected to the hub device 804 and the TV 808 so as to transmit or receive device information, and the TV 808 may be connected to the light bulb 806 so as to transmit or receive device information. For example, the TV 808 and the hub device 804 may be connected to an external IP network (e.g., PDN), and each of the camera 802 and the light bulb 806 may be connected to a device that is adjacent to or has a high signal strength from among devices accessible to the external network, or may directly select a connection target device. The hub device 804 and the TV 808 may be connected to a cloud server via the IP network.

According to various embodiments, each device on the local network may receive device information of the corresponding device and device information of another device in the local network. For example, devices in the network may receive device information and connection information between the devices in the network via the cloud server. According to an embodiment, devices (e.g., camera 802 and light bulb 806) that cannot be directly connected to the cloud server may receive device information of other devices via devices (e.g., hub device 804 and TV 808) that can be connected to the cloud server. Using the device information, each device may calculate a score of the corresponding device and scores of other devices on the basis of parameters (e.g., security parameter, performance parameter, and/or utility parameter) of the device information.

According to various embodiments, the TV 808 may calculate a score of the TV 808 to be 120 in operation 832, based on device information of the TV 808. The score is the score of the TV 808 itself, and a hop count may be thus represented as zero. The TV 808 may transmit calculated score 120 and hop count 0 to the light bulb 806 connected to the TV 808.

According to various embodiments, the hub device 804 may calculate a score of the hub device 804 to be 150 in operation 834, based on device information of the hub device 804. The hub device 804 may transmit calculated score 150 and hop count 0 to the camera 802 and light bulb 806 connected to the hub device 804.

According to various embodiments, the light bulb 806 may calculate a score of the light bulb 806 to be 3 in operation 836, based on device information of the light bulb 806. The light bulb 806 is a device that does not include processor and memory resources for a provisioning operation and may thus have a low score. The light bulb 806 may configure hop count 1 for the TV 808 and the hub device 804. The light bulb 806 may transmit the score and hop count of the light bulb 806, which are calculated by the light bulb itself, and the scores and hop counts of the TV 808 and hub device 804 to the connected hub device 804 and TV 808.

According to various embodiments, the camera 802 may calculate a score of the camera 802 to be 52 in operation 838, based on device information of the camera 802. The camera 802 may configure a hop count of 0. The camera 802 may transmit the score and hop count of the camera 802, which are calculated by the camera itself, and the score and hop count of the hub device 804 to the connected hub device 804.

According to various embodiments, the hub device 804 may acquire all the scores of the camera 802, the light bulb 806, and the TV 808 and may update the hop counts thereof, in operation 839. For example, the score of the TV 808 is transmitted to the hub device 804 via the light bulb 806, and a hop count may be thus configured to 2. The hub device 804 may transmit the scores and hop counts of respective devices to the camera 802 and the light bulb 806.

According to various embodiments, the light bulb 806 may acquire all the scores of the camera 802, the hub device 804, and the TV 808 and may update the hop counts thereof, in operation 840. The light bulb 806 may transmit the scores and hop counts of respective devices to the hub device 804 and the TV 808.

According to various embodiments, as described in operations 832 to 840, each device in the local network may calculate its own score and transmit the score to another connected device, and may receive device information of another device so as to calculate a score of the another device.

Although not shown, according to various embodiments, each device in the local network may receive a calculated score from the cloud server so as to calculate a score of another device. For example, the cloud server may receive device information in real time and/or upon onboarding of multiple devices in the local network, may calculate scores on the basis of the device information of the respective devices, and may transmit calculation results to the multiple devices in the network.

According to various embodiments, respective devices may update the scores for a configured time period (e.g., 1 minute to 10 minutes). In operations 842, 844, 846, and 848, respective devices may determine that the configured time has elapsed and there is no additional device information update. Accordingly, the scores of respective devices in the local network may be determined. The scores may be the same in all devices (e.g., 52 for the camera, 150 for the hub device, 3 for the light bulb, and 120 for the TV), and the hop counts may be configured differently.

Figure 9:
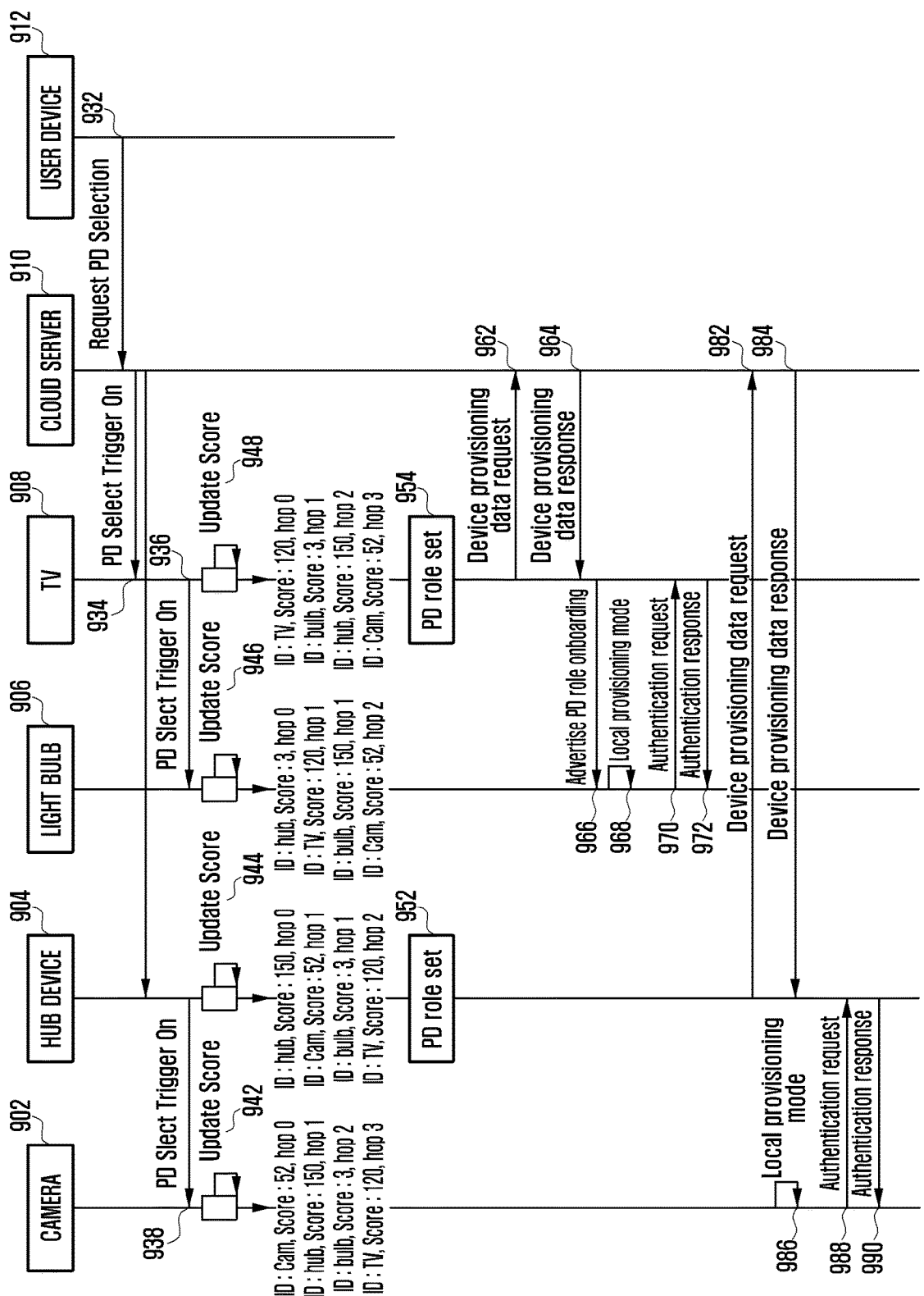
FIG. 9 is a signal flow diagram illustrating an example of determining a provisioning device via scoring of each device according to various embodiments.

FIG. 9 is a signal flow diagram of an example of determining a provisioning device via scoring of each device according to various embodiments.

FIG. 9 illustrates operations, after the scoring in FIG. 8, of respective devices after selection of a provisioning device is triggered.

According to various embodiments, a user device 912 may request, in operation 932, a cloud server 910 to select a provisioning device, based on a user input on an application. Since a provisioning device has a security issue, if a user directly requests selection of the provisioning device via the user device 912, selection of the provisioning device and a local provisioning operation may be performed.

According to various embodiments, the cloud server 910 may transmit, in operation 934, a command for triggering provisioning selection to a hub device 904 (e.g., hub device 804 of FIG. 8) and a TV 908 (e.g., TV 808 of FIG. 8) that may be connected to the cloud server 910 via an IP network.

According to various embodiments, the TV 908 may transmit, in operation 936, a trigger command for provisioning device selection to a light bulb 906 (e.g., light bulb 806 of FIG. 8) connected to the TV 908, and the hub device 904 may transmit, in operation 938, a trigger command for provisioning device selection to a camera 902 (e.g., camera 802 of FIG. 8) connected to the hub device 904.

According to various embodiments, in operations 942, 944, 946, and 948, the camera 902, the hub device 904, the light bulb 906, and the TV 908 may update scores of the respective devices. As in the procedures of FIG. 8, since there is no device newly added after calculating and exchanging the scores of respective devices, the scores of respective devices may be maintained to be 52, 150, 3, and 120.

According to various embodiments, the hub device 904 and the TV 908 among the devices in the local network may be determined as provisioning devices, and may be determined to perform provisioning operations on the connected camera 902 and light bulb 906 respectively.

According to various embodiments, in operation 952, the hub device 904 may identify determination as a provisioning device and may configure a resource required to operate as the provisioning device. The hub device 904 may configure a high value by adding a specific value (e.g., 3000) to its own score. At least partially at the same time, in operation 954, the TV 908 may identify determination as a provisioning device and may configure a resource required to operate as the provisioning device. The TV 908 may configure a high value by adding a specific value (e.g., 3000) to its own score.

According to various embodiments, in operation 962, the TV 908 may request the cloud server 910 to transmit provisioning data. For example, the TV 908 is determined to perform a provisioning operation on the light bulb 906, and thus authentication information of the light bulb 906, which is stored in the cloud server 910, may be requested. In operation 964, the cloud server 910 may transmit the authentication information of the light bulb 906 in response to the request of the TV 908.

According to various embodiments, in operation 966, the TV 908 may advertise to other devices that the TV has been registered as a provisioning device. In operation 968, the light bulb 906 may be configured to a local provisioning mode so as to perform an authentication procedure with respect to the TV 908 that is the provisioning device. The light bulb 906 may transmit, in operation 970, an authentication request to the TV 908, and in operation 972, the TV 908 may authenticate the light bulb 906 based on the authentication information received from the cloud server 910 and stored, and may transmit a response to the authentication request.

According to various embodiments, the hub device 904 may not advertise to other devices that the hub device has been registered as a provisioning device. In this case, the camera 902 may wait for a determined time (e.g., 30 seconds) after a provisioning trigger and then may be configured to the local provisioning mode. The camera 902 may transmit, in operation 988, an authentication request to the hub device 904, and in operation 990, the hub device 904 may authenticate the camera 902 based on the authentication information received from the cloud server 910 and stored, and may transmit a response to the authentication request.

In the embodiment of FIG. 9, it is described that two devices (hub device 904 and TV 908) are determined as provisioning devices ("PD role set"), but the number of provisioning devices on the local network is not limited thereto. For example, the hub device 904 may be selected as a provisioning device, and in this case, the hub device 904 may perform provisioning operations on the TV 908, the camera 902, and the light bulb 906. Alternatively, three or more devices on the local network may be determined as provisioning devices.

According to various embodiments, the number of devices determined as provisioning devices among local network devices may be determined based on the number of devices in the local network and/or connection relationships between devices. For example, the connection relationships of devices may include a connection state with the cloud server 910 and/or hop counts between the devices.

Figure 10:
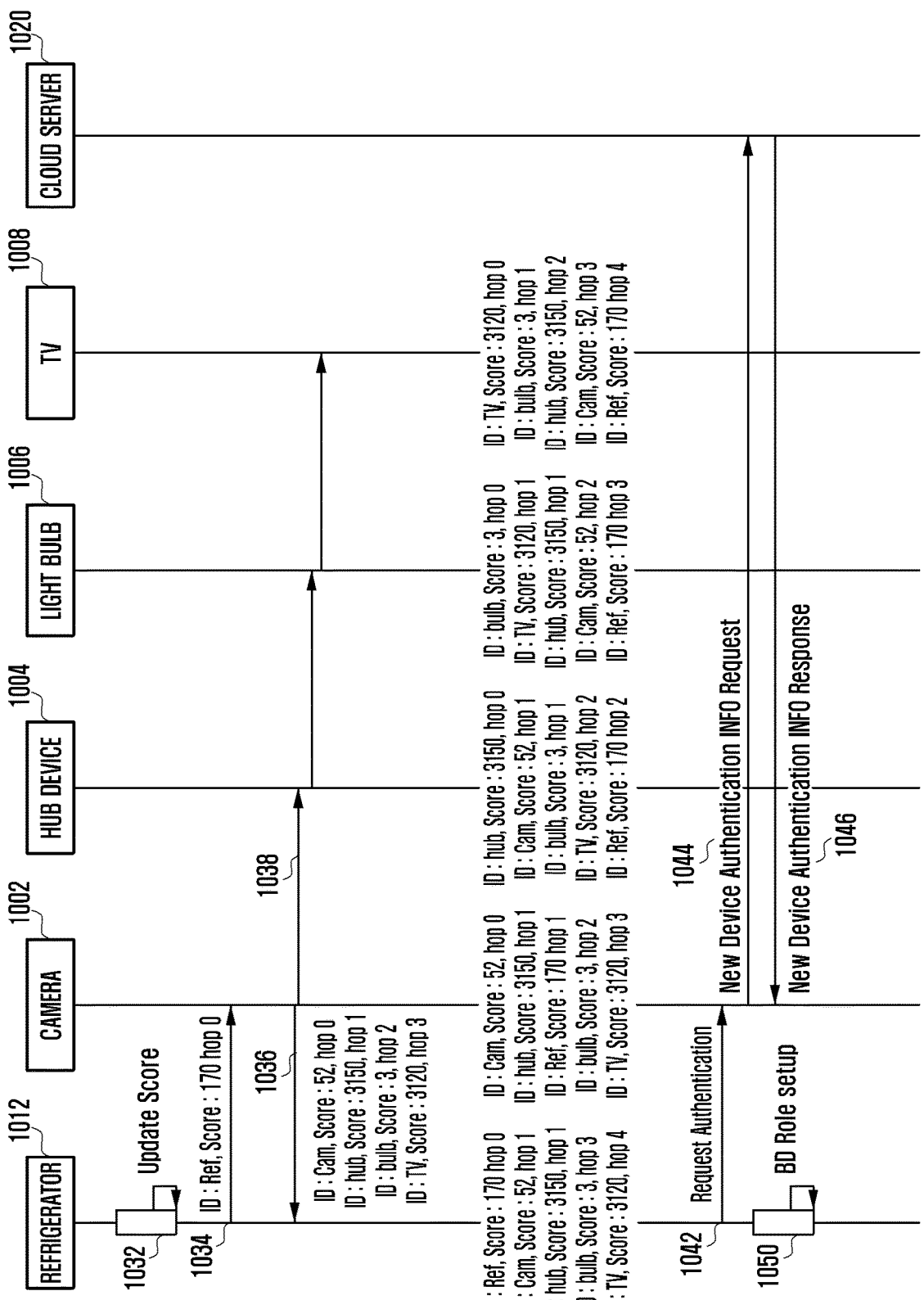
FIG. 10 is a signal flow diagram illustrating an example of determining a provisioning device via scoring of each device according to various embodiments.

FIG. 10 is a signal flow diagram of an example of determining a provisioning device via scoring of each device according to various embodiments.

FIG. 10 illustrates an example procedure of updating scores of the respective devices and selecting a provisioning device, when a refrigerator 1012 is newly connected to the local network after scoring respective devices and selecting a provisioning device in FIG. 8 and FIG. 9.

According to various embodiments, in operation 1032, the refrigerator 1012 may be added in the local network, and the refrigerator 1012 may be directly connected to a camera 1002 (e.g., camera 802 of FIG. 8 or camera 902 of FIG. 9) via short-range communication or an access point. If the refrigerator 1012 is on-boarded in a cloud server 1020, a score of the refrigerator 1012 may be calculated according to a trigger of other devices in the local network and/or the cloud server 1020. In operation 1034, the refrigerator 1012 may calculate the score of the refrigerator 1012 to be 170, based on device information of the refrigerator 1012.

According to various embodiments, in operation 1034, the refrigerator 1012 may transmit the score and hop count of the refrigerator 1012, which are calculated by the refrigerator itself, to a connected camera 1002.

According to various embodiments, in operation 1036, the camera 1002 may receive the score and hop count of the refrigerator 1012 and may transmit scores (e.g., scores calculated in FIG. 9) of devices located in the local network, which are stored in the camera 1002, to the refrigerator 1012.

According to various embodiments, in operation 1038, the camera 1002 may transmit the score and hop count of the refrigerator 1012, which are received from the refrigerator 1012, to the hub device 1004 (e.g., hub device 804 of FIG. 8 or hub device 904 of FIG. 9), the hub device 1004 may transmit the same to the light bulb 1006 (e.g., light bulb 806 of FIG. 8 or light bulb 906 of FIG. 9), and the light bulb 1006 may transmit the same to the TV 1008 (e.g., TV 808 of FIG. 8 or TV 908 of FIG. 9). Accordingly, respective devices may identify the scores of four devices located in the local network and the score of the newly added refrigerator 1012.

As a result of the scoring, the score of the refrigerator 1012 is lower than the scores of the TV 1008 and the hub device 1004 which have been previously selected as the provisioning devices, and the provisioning devices on the local network may be thus kept to two devices which are the TV 1008 and the hub device 1004. The score of the refrigerator 1012 is higher than the scores of the light bulb 1006 and the camera 1002, and the refrigerator may be thus determined to be a backup provisioning device. Thereafter, when the TV 1008 or the hub device 1004 is turned off or removed out of the network, the refrigerator 1012 may operate as a provisioning device.

According to various embodiments, in operation 1042, the refrigerator 1012 may transmit an authentication request to the camera 1002 serving as a provisioning device. The camera 1002 may request, in operation 1044, authentication information of the refrigerator 1012 from the cloud server 1020, and in operation 1046, the cloud server 1020 may transmit the authentication information of the refrigerator 1012 stored in the database to the camera 1002, and the camera 1002 may synchronize the authentication information.

According to various embodiments, in operation 1050, the refrigerator 1012 may be configured to operate as a backup provisioning device.

Figure 11:
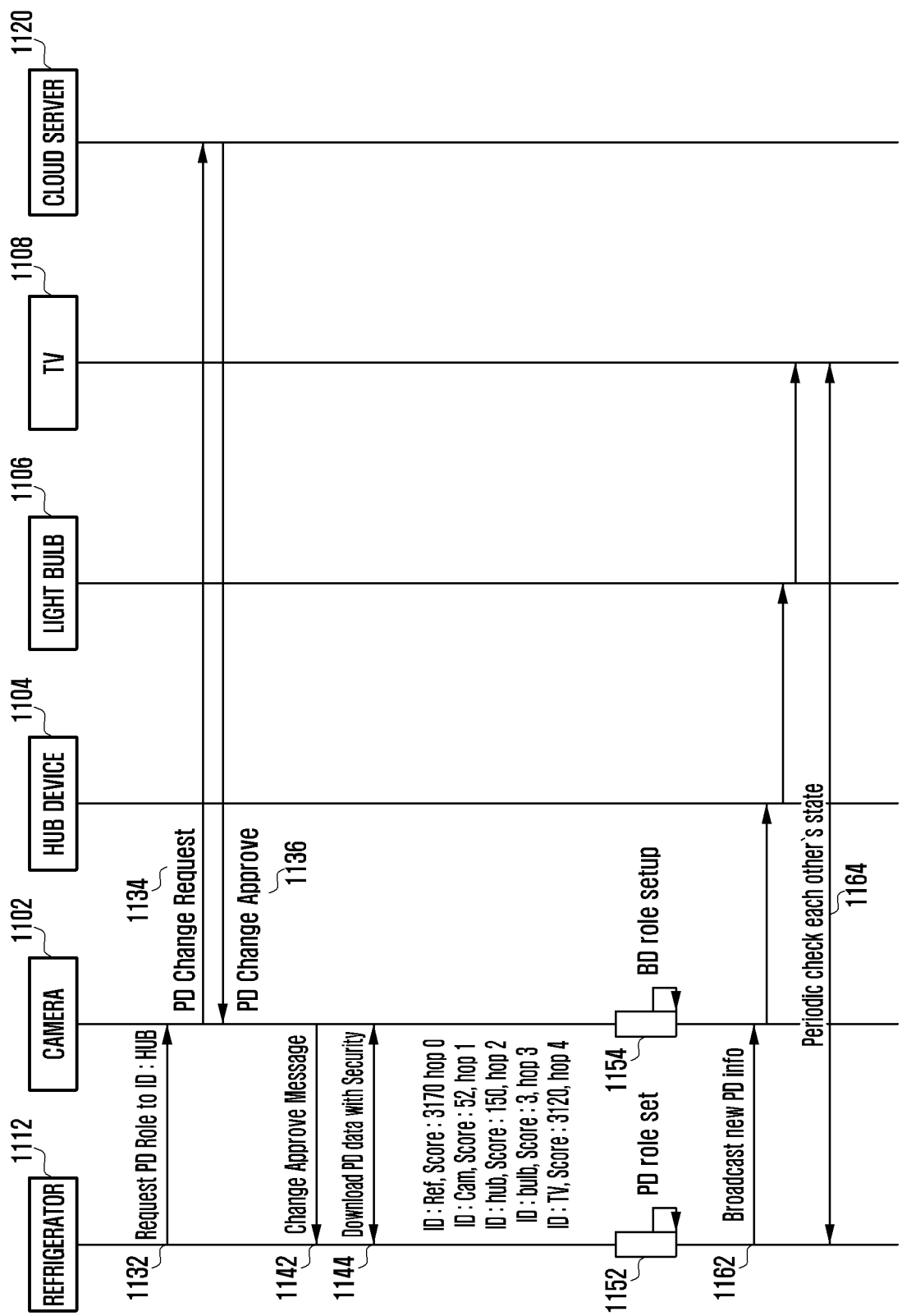
FIG. 11 is a signal flow diagram illustrating an example operation of each device when a change event of a provisioning device occurs according to various embodiments.

FIG. 11 is a signal flow diagram illustrating an example operation of each device when a change event of a provisioning device occurs according to various embodiments.

According to various embodiments, if a new device is selected as a provisioning device after a provisioning operation is performed in a cloud server 1120 (e.g., cloud server 1020 of FIG. 10) or a specific device in the local network is selected as a provisioning device, a provisioning role change may be requested. For example, if a specific device in the local network is selected as a provisioning device and then disappears or is removed from the network during operation or fails to normally perform an operation with the cloud server 1120, or if the cloud server 1120 does not operate normally or communication with an external network is impossible while the cloud server 1120 is performing a provisioning operation due to absence of a provisioning device in the local network, a role change may be performed based on protocols agreed between devices in the local network. According to an embodiment, when communication between the cloud server 1120 and a device in the local network is normally performed, a role of a provisioning device may be changed via the cloud server 1120 based on a provisioning device change request made to the cloud server 1120 and approval thereof. According to an embodiment, if a provisioning device is changed by communication between respective devices on the local network, the provisioning device or another device in the local network may transmit the change of the provisioning device to the server.

According to various embodiments, when an event in which a provisioning device is changed from a camera 1102 (e.g., camera 1002 of FIG. 10) to a refrigerator 1112 (e.g., refrigerator 1012 of FIG. 10) occurs, the refrigerator 1112 may transmit, to the camera 1102, a request to change a role of the refrigerator 1112, in operation 1132. The camera 1102 may transmit a provisioning device change request to the cloud server 1120 in operation 1134, and the cloud server 1120 may provide a notification of change approval to the camera 1102 in operation 1136. In operation 1142, the camera 1102 may transmit an approval message to the refrigerator 1112 according to the notification of change approval of the cloud server 1120.

According to various embodiments, in operation 1144, the refrigerator 1112, whose role has been changed to that of a provisioning device, may request transmission of authentication information of respective devices in the local network, which is stored in a database of the camera 1102, and may receive and store the authentication information from the camera 1102. When the authentication information stored in the camera 1102 is transmitted to the refrigerator 1112, the refrigerator 1112 may configure a role of a provisioning device in operation 1152, and the camera 1102 may configure a role as a backup provisioning device and delete the pre-stored authentication information in operation 1154.

According to various embodiments, in operation 1162, the refrigerator 1112 may transmit provisioning device change information to respective devices in the local network via the camera 1102. After the refrigerator 1112 starts a provisioning operation, the refrigerator 1112 and the TV 1108, which are provisioning devices of the local network, may periodically exchange states of other devices in operation 1164, and if a determined event occurs in the refrigerator 1112 and/or the TV 1108, which are the provisioning devices of the local network, an operation for changing the provisioning devices may be performed.

Figure 12:
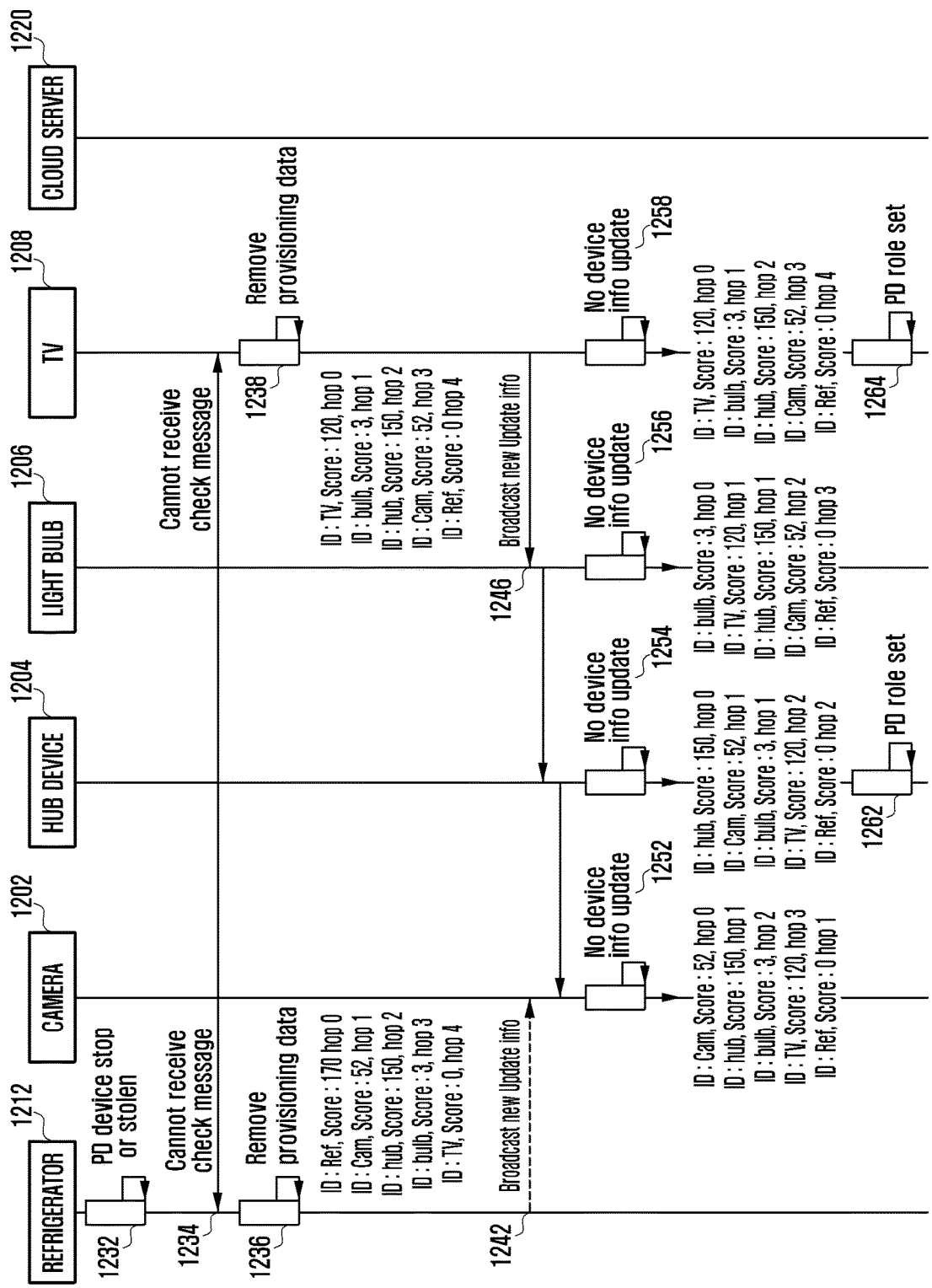
FIG. 12 is a signal flow diagram illustrating an example operation of each device when a provisioning device is removed according to various embodiments.

FIG. 12 is a signal flow diagram illustrating an example operation of each device when a provisioning device is removed according to various embodiments.

According to various embodiments, if a provisioning device has a defect, is out of or removed from a network, or fails to provide secure communication to other devices, and/or provisioning data (or authentication information) is deleted, another device may be selected as a provisioning device. In this case, respective devices in the local network may again perform procedures of calculating a score and selecting a provisioning device.

FIG. 12 illustrates an example procedure of selecting a new provisioning device in a case in which, while a refrigerator 1212 (e.g., refrigerator 1112 of FIG. 11) and a TV 1208 (e.g., TV 1108 of FIG. 11) are operating as provisioning devices, the refrigerator 1212 is unable to operate as the provisioning device due to, for example, malfunction or theft thereof.

According to various embodiments, in operation 1232, the refrigerator 1212 may identify an event (e.g., malfunction or theft) that a provisioning operation cannot be performed. The refrigerator 1212 and the TV 1208, which are currently provisioning devices, may periodically exchange check messages including a state of each provisioning device and information of other connected devices, and the TV 1208 may fail to receive a check message in operation 1234 due to an event occurring in the refrigerator 1212.

According to various embodiments, in operation 1236, as the role of the provisioning device is stopped, the refrigerator 1212 may delete stored provisioning data (or authentication information), and the TV 1208 may also delete provisioning data in operation 1238.

According to various embodiments, the refrigerator 1212 and the TV 1208 operating as a provisioning device may periodically broadcast update information related to their own states in order to continuously check each other's state, and may broadcast update information including related information if the refrigerator 1212 and the TV 1208 cannot operate as a provisioning device. According to an embodiment, if only one provisioning device exists on the local network, the device may periodically transmit update information to a cloud server 1220. According to an embodiment, if a provisioning device (PD) and a backup device (BD) exist on the local network, the provisioning device and the backup device may periodically exchange update information.

According to various embodiments, in operation 1242, the refrigerator 1212 may broadcast update information including the fact that a provisioning device role has stopped, and the TV 1208 may identify that the refrigerator 1212 has stopped operating as a provisioning device, according to the update information transmitted from the refrigerator 1212. In operation 1246, the TV 1208 may broadcast the update information.

According to various embodiments, if the same update information is received for a predetermined time after the provisioning device role is stopped, the camera 1202, a hub device 1204, the light bulb 1206, and the TV 1208 may determine that there is no additional update information in operations 1252, 1254, 1256, and 1258, respectively. Thereafter, respective devices in the local network may perform scoring for selection of a provisioning device in the same manner as in FIG. 8, and the hub device 1204 and the TV 1208 having highest scores may configure a role of a provisioning device according to scoring results. The hub device 1204 may perform configuration, in operation 1262, to operate as a provisioning device, and the TV 1208 may perform configuration, in operation 1264, to operate as a provisioning device.

Figure 13:
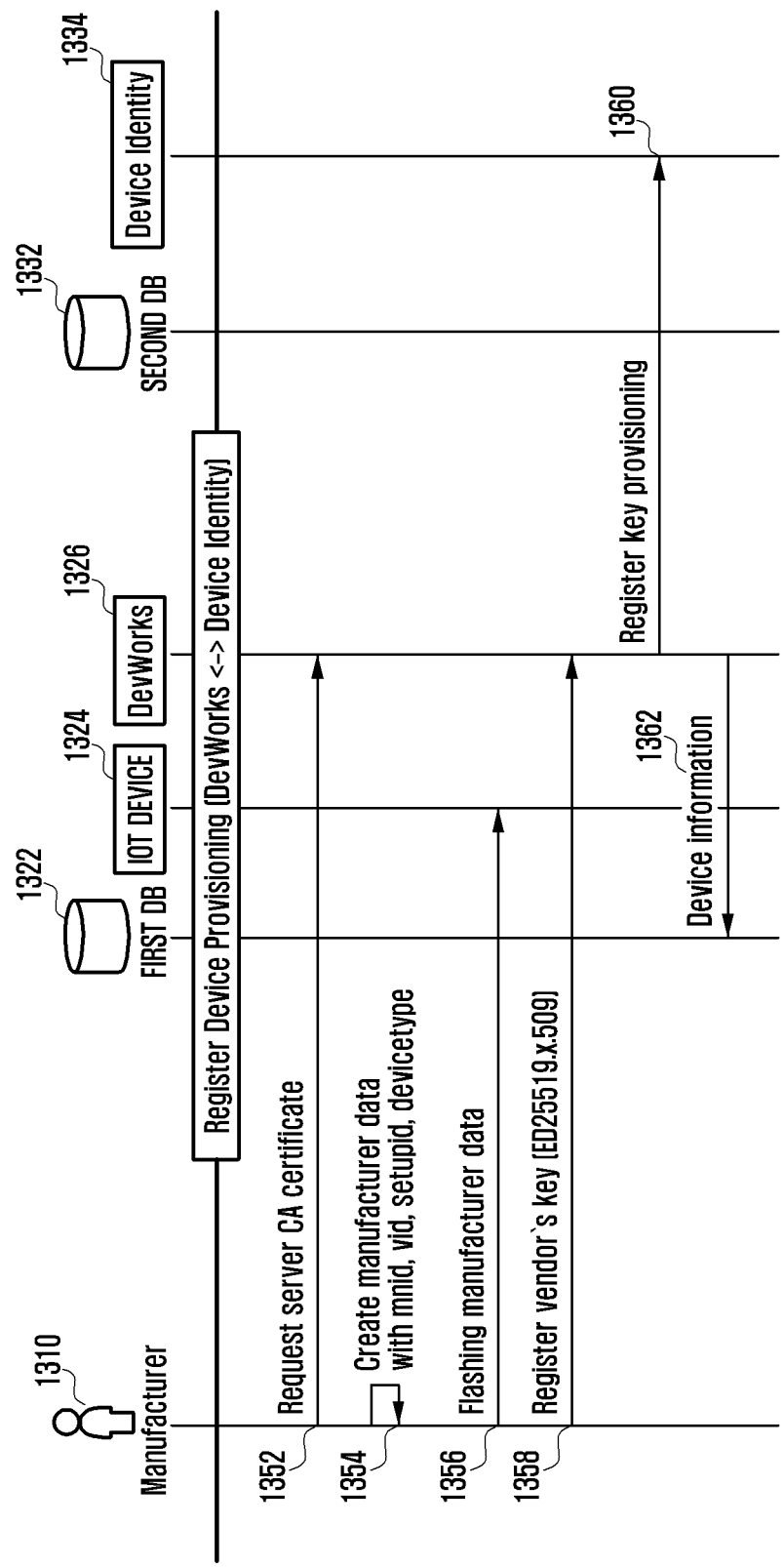
FIG. 13 is a signal flow diagram illustrating an example procedure of registering authentication information in a processing procedure according to various embodiments.

FIG. 13 is a signal flow diagram illustrating an example procedure of registering authentication information in a processing procedure according to various embodiments.

According to various embodiments, in operation 1352, during processing of an IoT device 1324, a manufacturer 1310 may request a certificate of the IoT device 1324 from a developer workspace 1326. The developer workspace 1326 may be an online environment in which an IoT server provides a service related to authentication and registration of the IoT device 1324.

According to various embodiments, in operation 1354, the manufacturer may generate process data (or manufacturer data). For example, the generated process data may include at least one of mnID, vID, setupID, and device type information. According to an embodiment, the process data may further include at least some of a public key type (e.g., X.509 or ED 25519), a server CA certificate, a device certificate, a device public key, a device private key, or a device serial number.

According to various embodiments, in operation 1356, the manufacturer may store (or flash) the generated process data in the IoT device 1324.

According to various embodiments, in operation 1358, the manufacturer may register a vendor key in the developer workspace 1326. Here, the vendor key may be security information registered for the IoT device 1324. For example, the manufacturer may register a serial number, a public key (e.g., ED 25519), and a vendor certificate (e.g., X.509) on the workspace 1326. The manufacturer may register generated device information of the IoT device via the developer workspace 1326.

According to various embodiments, in operation 1360, the information (e.g., serial number and/or public key) registered on the developer workspace 1326 may be registered in a device identity 1334 of a second DB 1332 (e.g., dynamo DB) on the IoT server.

According to various embodiments, the device information (e g , mnID, vID, setupID, and/or device type information) registered on the developer workspace 1326 may be stored in a first DB 1422 (e.g., SQL DB) in operation 1362.

The first DB 1422 may configure and store device information of each device in a table, and an example of device information of a specific device, which is stored in the first DB 1422 is shown in Table 3.

TABLE 3 aws:rep:deleting Boolean L false
aws:rep:updateregion String : ap-northeast-2
aws:rep:updatetime Number : 1582698157.268001
device String : 7e35ef87-b488-4d8d-8cb5-7fdf65bc9095
label String : LED_SAMPLE_EA
locationId String : 12aaa468-106e-4ecc-85e7-42ff881c06a7
mapperId String : 0AEd#STDK0AEd5cb58351
metadata Map {6}
claimId String : 91ebf8ba-c296-5379-1132-964c3b8257ac
deviceTypeId String : Light
mnId String : 0AEd
registrationPayloadType String : json
serialNumber String : STDK0AEd5cd58351
vid String : EXAM123
profileId String : 3918f11e-c21c-47fe-b7f4-4634d9c70845
roomId String : ba817b52-8434-495c-b856-34c8bfa23d98
routingKey String : ap The device identity 1334 of the second DB 1332 may store a public key registered for each device. If a specific device is determined as a provisioning device on a specific local network, a cloud server may transmit, to the provisioning device, authentication information including device information and key information stored in the first DB and the second DB with respect to each device in the local network, and may store the received authentication information in a local database of the provisioning device.

Figure 14:
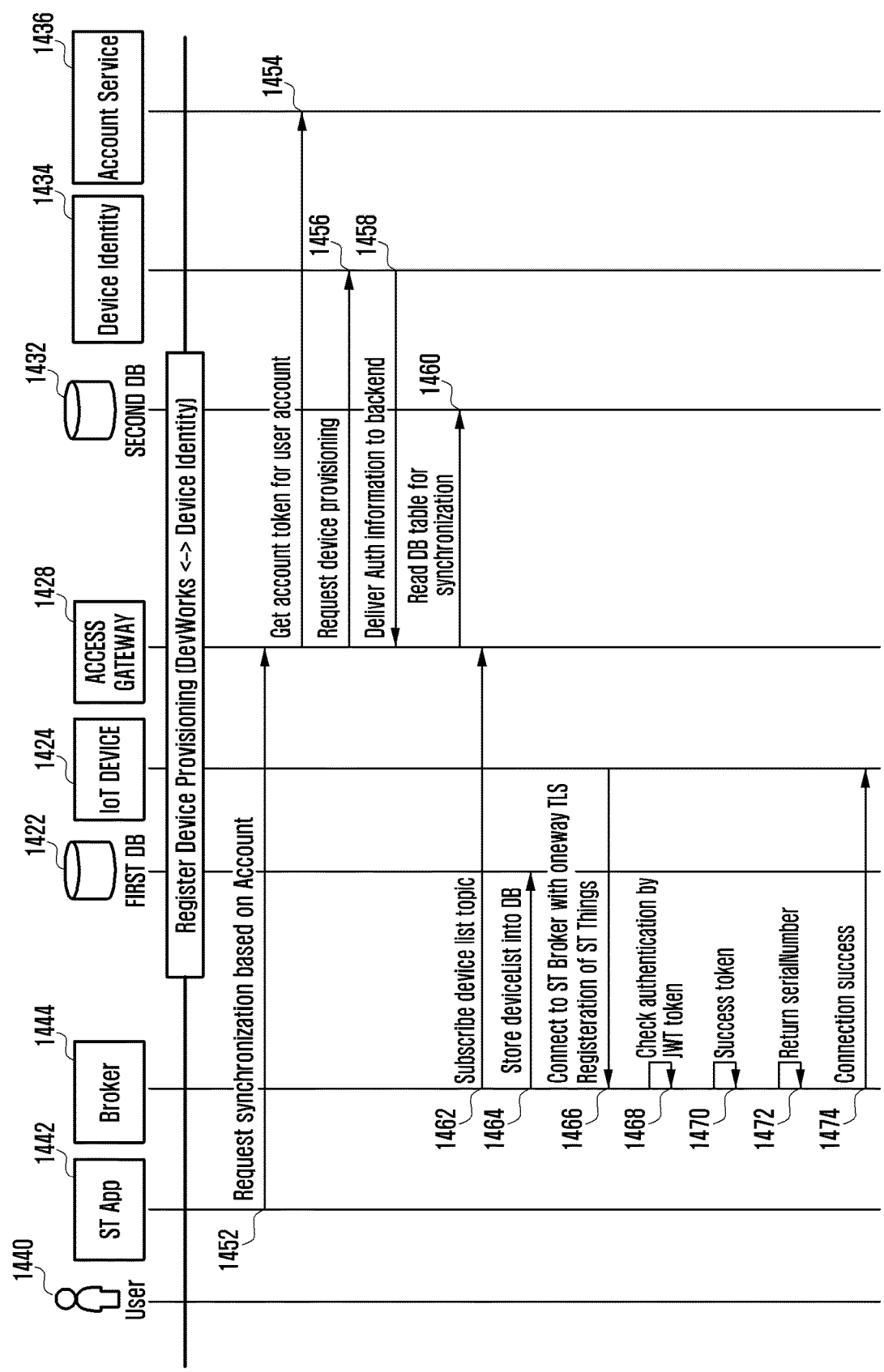
FIG. 14 is a signal flow diagram illustrating an example procedure of synchronizing authentication information according to various embodiments.

FIG. 14 is a signal flow diagram illustrating an example procedure of synchronizing authentication information according to various embodiments.

FIG. 14 relates to a procedure of synchronizing authentication information of an IoT device 1424, when the IoT device 1424, the device information of which has been registered on an IoT server via the procedure of FIG. 13, is installed on a local network.

According to various embodiments, in operation 1452, a user 1440 may request synchronization of authentication information of the IoT device 1424 from an access gateway 1428 based on an account using an application ST App 1442 of a user device. For example, the access gateway 1428 (e.g., Great Gate) may be a server device or a service module for receiving a connection and/or device event of each device in the local network on a cloud network. When the IoT device 1424 is on-boarded on the IoT server, registration may be performed based on the account on the user device, and the IoT server may store authentication information of the IoT device 1424, based on the account used during the registration.

According to an embodiment, when the IoT device 1424 is on-boarded on the IoT server, registration may be performed based on a location of the IoT device 1424 on the user device, and in this case, the user may request synchronization of the authentication information of the IoT device 1424 from the access gateway 1428, based on the location of the IoT device 1424 using the application ST App 1442 of the user device.

According to various embodiments, in operation 1454, when the synchronization request is received, the access gateway 1428 may acquire a token for the corresponding user account from an account service 1436 of the IoT server.

According to various embodiments, in operation 1456, the access gateway 1428 may request device provisioning from a device identity 1434. In operation 1458, the device identity 1434 may transfer the authentication information to the access gateway 1428 in response to the provisioning request. In operation 1460, the access gateway 1428 may read information of a DB table, which stores information of the IoT device 1424 registered with the corresponding account, in the second DB 1432 using the acquired token for synchronization of the authentication information.

According to various embodiments, in operation 1462, a broker server 1444 (e.g., SmartThings™ broker) may subscribe to the access gateway 1428 (e.g., Great Gate) via an MQTT topic so as to obtain device list information.

According to various embodiments, in operation 1464, the broker server 1444 may store the device list information obtained from the access gateway 1428 in a first DB 1422 (e.g., SQL DB) of the IoT device 1424.

According to various embodiments, in operation 1466, the IoT device 1424 may be connected to the broker server 1444 to register the IoT device 1424. The IoT device 1424 may be connected to the broker server 1444 using one way transport layer security (TLS).

According to various embodiments, the broker server 1444 may check authentication via Jason web token (JWT) in operation 1468, and may succeed in token authentication in operation 1470. The broker server 1444 may return a serial number of the IoT device 1424 in operation 1472, and may transfer a connection success to the IoT device 1424 in operation 1474.

Figure 15:
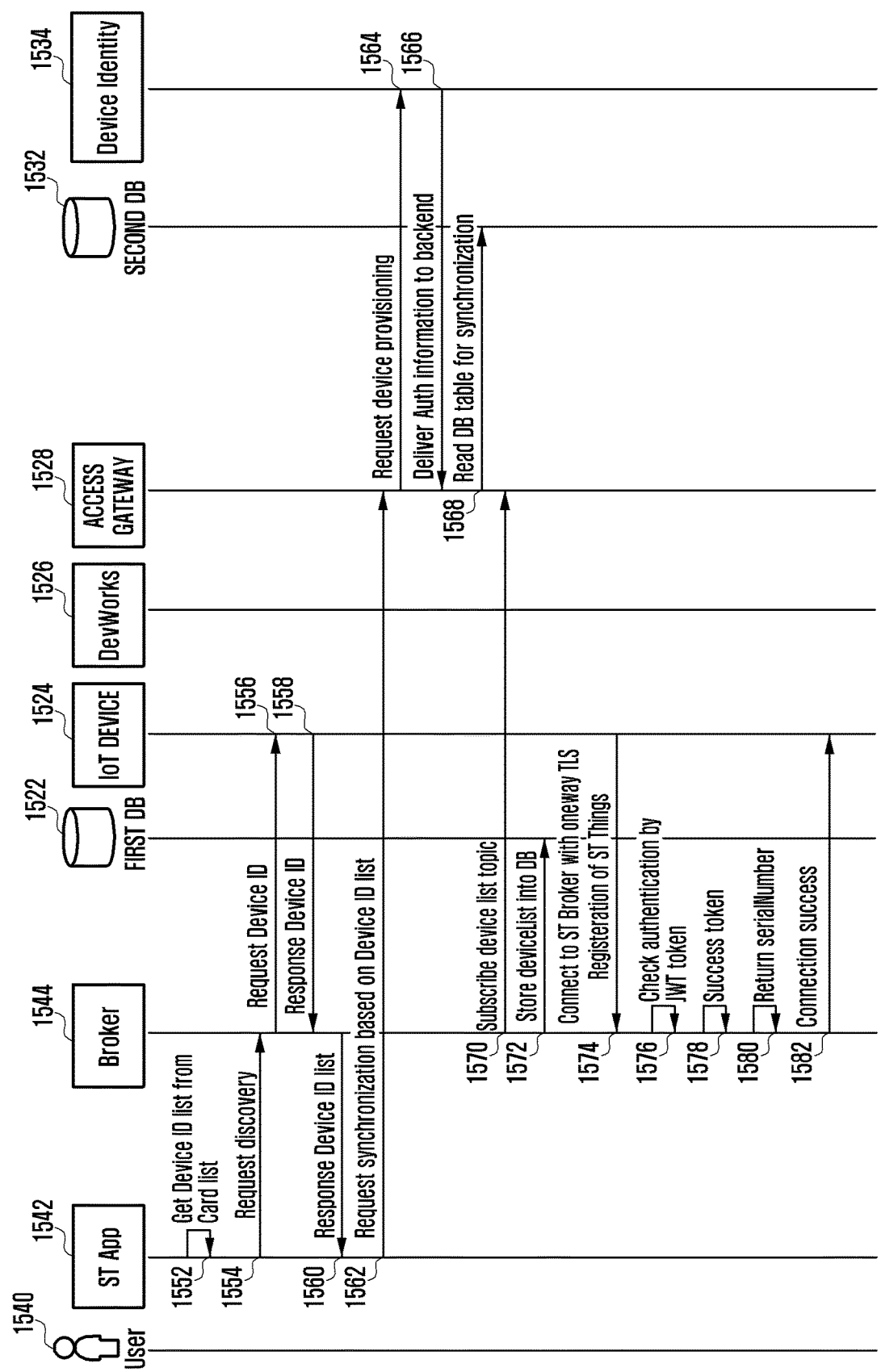
FIG. 15 is a signal flow diagram illustrating an example procedure of synchronizing authentication information according to various embodiments.

FIG. 15 is a signal flow diagram illustrating an example procedure of synchronizing authentication information according to various embodiments.

According to various embodiments, in operation 1552, a user 1540 may acquire a device list of respective devices in a local network from a card list displayed on an application ST App 1542 of a user device. In operation 1554, the application 1542 may request discovery of the local network from a broker server 1544 (e.g., broker server 1444 of FIG. 14, SmartThings™ broker). The broker server 1544 may request a device ID from an IoT device 1524 located in the local network in operation 1556, and the IoT device 1524 may transmit the device ID in operation 1558. In operation 1560, the broker server 1544 may transmit a device ID list to the application 1542 of the user device.

According to various embodiments, in operation 1562, the application 1542 of the user device may request an access gateway 1528 (e.g., access gateway 1428, Great Gate in FIG. 14) to synchronize authentication information, based on the acquired device ID list. In operation 1564, the access gateway 1528 may request device provisioning from a device identity 1534 of an IoT server. In operation 1566, the device identity 1534 may transfer the authentication information to the access gateway 1528 in response to the provisioning request. In operation 1568, the access gateway 1528 may read information of a DB table in a second DB 1532, in which information of the IoT device 1524 is stored, for synchronization of the authentication information.

According to various embodiments, in operation 1570, the broker server 1544 may subscribe to the access gateway 1528 via an MQTT topic so as to obtain device list information.

According to various embodiments, in operation 1572, the broker server 1544 may store the device list information obtained from the access gateway 1528 in a first DB 1522 (e.g., SQL DB) of the IoT device 1524.

According to various embodiments, in operation 1574, the IoT device 1524 may be connected to the broker server 1544 to register the IoT device 1524. The IoT device 1524 may be connected to the broker server 1544 by using one way transport layer security (TLS).

According to various embodiments, the broker server 1544 may check authentication via Jason web token (JWT) in operation 1576, and may succeed in token authentication in operation 1578. The broker server 1544 may return a serial number of the IoT device 1524 in operation 1580, and may transfer a connection success to the IoT device 1524 in operation 1582.

Figure 16A:
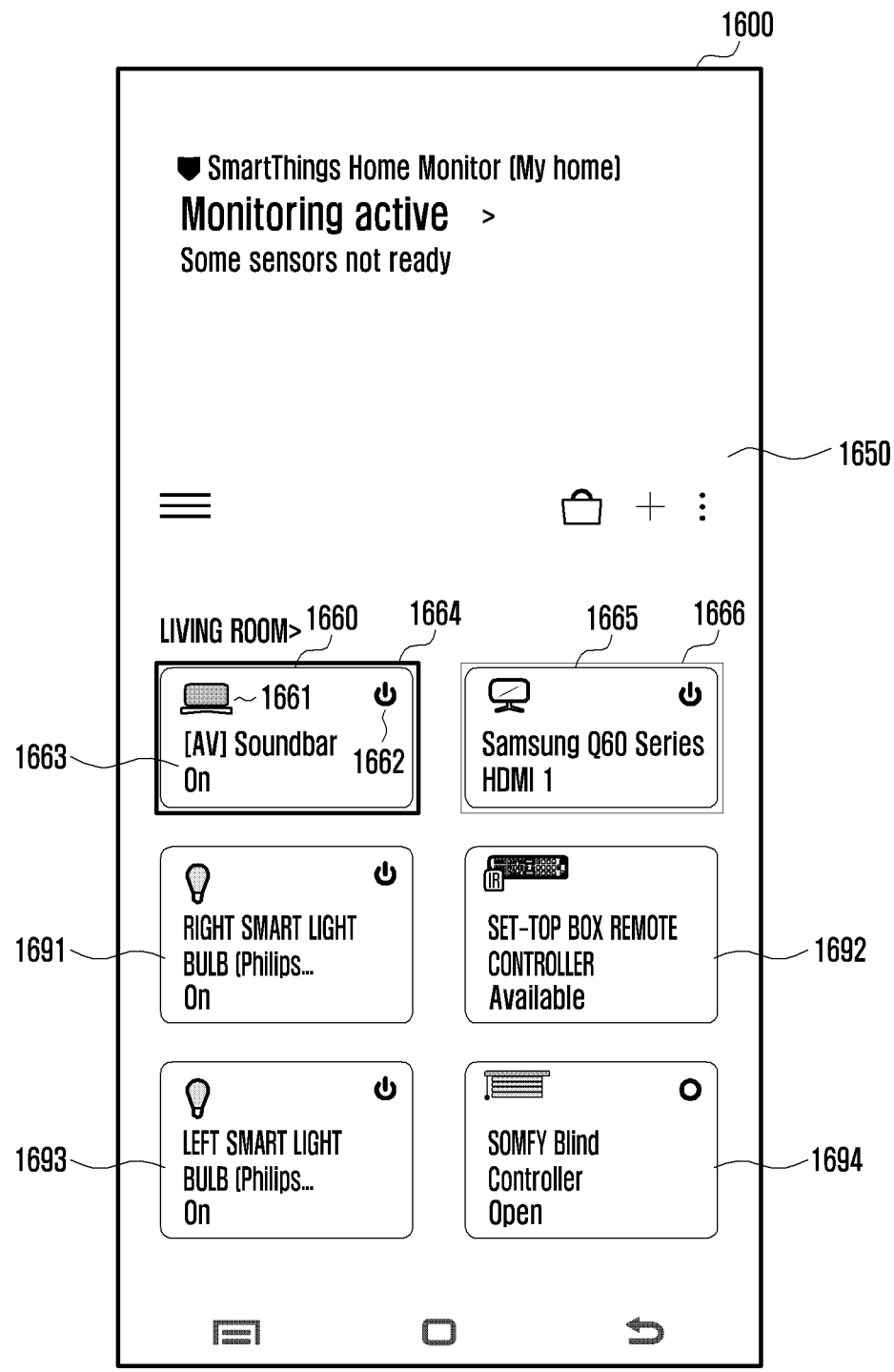
FIG. 16A and FIG. 16B illustrate an example user interface provided by a user device to control an IoT device according to various embodiments.
Figure 16B:
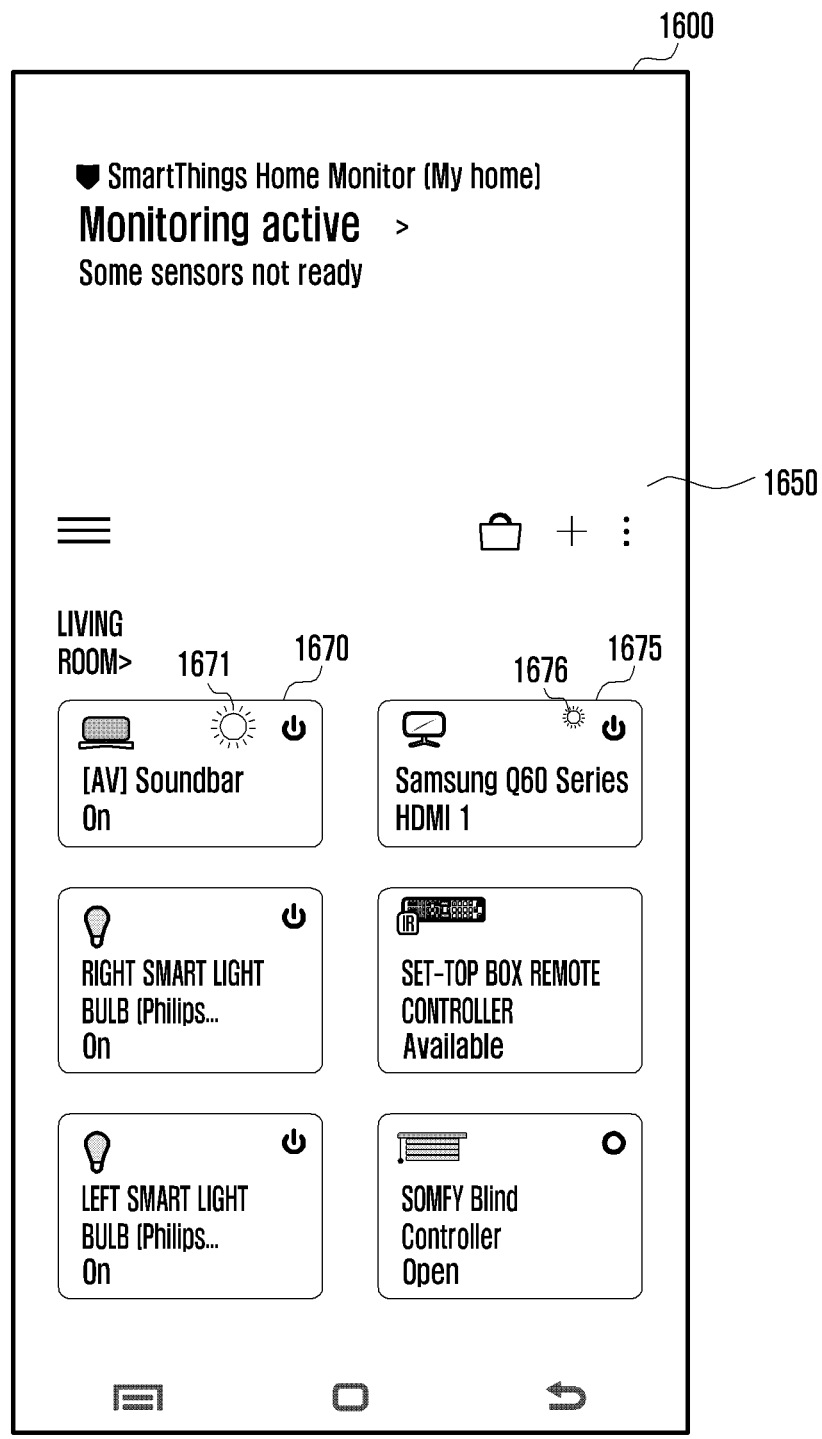

FIG. 16A and FIG. 16B illustrate a user interface provided by a user device 1600 to control an IoT device according to various embodiments.

According to various embodiments, a user device 1600 may display a UI item corresponding to each device of a local network on an application 1650. For example, the user device 1600 may display a UI item 1660 of an AV sound bar, a UI item 1665 of a TV, a UI item 1691 of a right light bulb, a UI item 1692 of a set-top box remote controller, a UI item 1693 of a left light bulb, and a UI item 1694 of an electric blind controller. Each UI item may include an image 1661 indicating a device, a device name 1663, information indicating an operating state (e.g., on/off, available/non-available, and open/close) of the device, and a button 1662 for changing the operating state of the device.

According to various embodiments, the user device 1600 may display UI items (e.g., UI items 1660 and 1665) of a provisioning device among respective devices of the local network visually distinctively from UI items of other devices. For example, referring to FIG. 16A, the user device 1600 may display (highlight or visually distinguish), using a box 1664 of a specific color, the periphery of the UI item 1660 of the AV sound bar which is a provisioning device, and may display (highlight or visually distinguish), using a box 1666 of a different color, the periphery of the UI item 1665 of the TV. According to an embodiment, the user device 1600 may display, distinctively from other devices, at least one of the image 1661, the device name 1663, the information indicating the operating state (e.g., on/off, available/non-available, and open/close) of the device, and the button 1662 for changing the operation state of the device, which are displayed in the UI items (e.g., UI items 1660 and 1665) of the provisioning device among respective devices of the local network. According to an embodiment, IoT devices connected to each provisioning device may be displayed using boxes of the same color as the provisioning device, but may be displayed with a thin thickness so as to be distinguished from the provisioning device. According to an embodiment, IoT devices connected to each provisioning device may be provided with the same icon as the provisioning device, but the sizes thereof may be small.

According to an embodiment, referring to FIG. 16B, icons 1671 and 1676 indicating the provisioning devices may be displayed within UI items 1670 and 1675 of the AV sound bar and TV which are the provisioning devices.

An electronic device (e.g., electronic device 400) according to various embodiments may include a communication module (e.g., communication module 430 including communication circuitry), and a processor (e.g., processor 410) operatively connected to the communication module, wherein the processor is configured to transmit device information of the electronic device to a cloud server (e.g., cloud server 500) or at least one external device (e.g., TV 632, laptop PC 634, or IP camera 636) existing in a local network using the communication module, identify at least one device determined as a provisioning device of an edge computing service from among the electronic device or the at least one external device, receive, based on the electronic device being determined as the provisioning device, authentication information of at least one device, for which the edge computing service is to be provided, from the cloud server by using the communication module, and perform provisioning related to the edge computing service based on the authentication information.

According to various embodiments, the processor may be configured to receive authentication information of at least one device registered using a same account on the cloud server.

According to various embodiments, the processor may be configured to receive authentication information of at least one device registered for a same location as the electronic device on the cloud server.

According to various embodiments, the processor may be configured to receive device information of at least one external device included in the local network from the at least one external device via the communication module, and to determine the provisioning device via scoring based on at least one parameter included in the device information of the electronic device and the device information of the at least one external device.

According to various embodiments, the device information may include at least one or more of a security parameter, a performance parameter, or a utility parameter of the electronic device or the external device.

According to various embodiments, the processor may be configured to assign a highest weight to the security parameter during the scoring.

According to various embodiments, the processor may be configured to identify multiple devices capable of operating as a provisioning device from among the electronic device and the at least one external device, and to determine the provisioning device using device information of the identified multiple devices.

According to various embodiments, the processor may be configured to determine the number of the provisioning devices, based on at least one of the number of devices located on the local network, a maximum hop count, or a configuration of a user device.

According to various embodiments, the processor may be configured to receive information of the determined provisioning device from the cloud server via the communication module.

According to various embodiments, the processor may be configured to, based on a new external device entering the local network, re-identify at least one device determined as the provisioning device.

According to various embodiments, the processor may be configured to, based on the electronic device not operating as the provisioning device after being registered as the provisioning device, provide a notification to the at least one external device and the cloud server, and delete the received authentication information.

A method for determining a provisioning device by an electronic device (e.g., electronic device 400) in an edge computing network according to various embodiments may include transmitting device information of the electronic device to a cloud server (e.g., cloud server 500) or at least one external device (e.g., TV 632, laptop PC 634, or IP camera 636) included in (or located on) a local network, identifying at least one device determined as a provisioning device of an edge computing service from among the electronic device or the at least one external device, receiving, based on the electronic device being determined as the provisioning device, authentication information of at least one device, for which the edge computing service is to be provided, from the cloud server, and performing provisioning related to the edge computing service based on the authentication information.

According to various embodiments, the receiving of the authentication information may include at least one of receiving authentication information of at least one device registered using a same account on the cloud server, or receiving authentication information of at least one device registered for a same location as the electronic device on the cloud server.

According to various embodiments, the identifying of the at least one device determined as the provisioning device may include receiving device information of at least one external device included in the local network from the at least one external device, and determining the provisioning device via scoring based on at least one parameter included in the device information of the electronic device and the device information of the at least one external device.

According to various embodiments, the device information may include at least one or more of a security parameter, a performance parameter, or a utility parameter of the electronic device or the external device.

According to various embodiments, the identifying of the at least one device determined as the provisioning device may include determining the number of the provisioning devices, based on at least one of the number of devices located on the local network, a maximum hop count, or a configuration of a user device.

According to various embodiments, the identifying of the at least one device determined as the provisioning device may include receiving information of the determined provisioning device from the cloud server.

A server device according to various embodiments may include a communication interface, a memory, and a processor operatively connected to the communication interface and the memory, wherein the processor is configured to store authentication information of multiple devices in the memory, receive device information from at least one electronic device located on a same local network, determine at least one device that is to operate as a provisioning device of an edge computing service from among the at least one electronic device via scoring based on at least one parameter included in the received device information, and transmit at least a part of the authentication information stored in the memory to the provisioning device.

According to various embodiments, the processor may be configured to transmit, to the provisioning device, authentication information of at least one device registered using a same account as the provisioning device or registered for a same location as the provisioning device.

According to various embodiments, the processor may be configured to identify multiple devices capable of operating as a provisioning device from among the at least one electronic device, and to determine the provisioning device using device information of the identified multiple devices.

What is claimed is:

1. An electronic device comprising:
a communication module including communication circuitry;
at least one processor operatively connected to the communication module;
memory storing instructions which, when executed by the at least one processor, cause the at least one processor to control the electronic device to:
  transmit device information of the electronic device to a cloud server or at least one external device located on a same local network as the electronic device, using the communication module,
  identify at least one device determined as a provisioning device of an edge computing service from among the electronic device and the at least one external device located on the same local network,
  based on the electronic device being determined as the provisioning device, receive authentication information of at least one device, for which the electronic device performs a provisioning operation, from the cloud server, using the communication module, and
  perform provisioning related to the edge computing service for one or more of the at least one external device on the same local network, based on the authentication information.

2. The electronic device of claim 1, wherein the instructions, when executed by the at least one processor, cause the at least one processor to control the electronic device to receive authentication information of at least one device registered using a same account on the cloud server.

3. The electronic device of claim 1, wherein the instructions, when executed by the at least one processor, cause the at least one processor to control the electronic device to receive authentication information of at least one device registered for a same location as the electronic device on the cloud server.

4. The electronic device of claim 1, wherein the instructions, when executed by the at least one processor, cause the at least one processor to control the electronic device to:
receive device information of at least one external device located on the same local network from the at least one external device via the communication module, and
determine the provisioning device via scoring based on at least one parameter included in the device information of the electronic device and the device information of the at least one external device.

5. The electronic device of claim 4, wherein the device information comprises at least one or more of a security parameter, a performance parameter, or a utility parameter of the electronic device or the external device.

6. The electronic device of claim 5, wherein the instructions, when executed by the at least one processor, cause the at least one processor to control the electronic device to assign a highest weight to the security parameter during the scoring.

7. The electronic device of claim 4, wherein the instructions, when executed by the at least one processor, cause the at least one processor control the electronic device to:
identify multiple devices capable of operating as a provisioning device from among the electronic device and the at least one external device, and
determine the provisioning device using device information of the identified multiple devices.

8. The electronic device of claim 4, wherein the instructions, when executed by the at least one processor, cause the at least one processor to control the electronic device to determine the number of the provisioning devices, based on at least one of a number of devices located on the same local network, a maximum hop count, or a configuration of a user device.

9. The electronic device of claim 1, wherein the instructions, when executed by the at least one processor, cause the at least one processor to control the electronic device to receive information of the determined provisioning device from the cloud server via the communication module.

10. The electronic device of claim 1, wherein the instructions, when executed by the at least one processor, cause the at least one processor to control the electronic device to, based on a new external device entering the local network, re-identify at least one device determined as the provisioning device.

11. The electronic device of claim 1, wherein the instructions, when executed by the at least one processor, cause the at least one processor to control the electronic device to:
based on the electronic device not operating as the provisioning device after being registered as the provisioning device, provide a notification to the at least one external device and the cloud server, and
delete the received authentication information.

12. A method for determining a provisioning device by an electronic device in an edge computing network, the method comprising:
transmitting device information of the electronic device to a cloud server or at least one external device located on a same local network as the electronic device;
identifying at least one device determined as a provisioning device of an edge computing service from among the electronic device and the at least one external device located on the same local network;
based on the electronic device being determined as the provisioning device,
receiving, by the electronic device, authentication information of at least one device, for which the electronic device performs a provisioning operation, from the cloud server; and
performing, by the electronic device, provisioning related to the edge computing service for one or more of the at least one external device on the same local network, based on the authentication information.

13. The method of claim 12, wherein the receiving of the authentication information comprises at least one of:
receiving authentication information of at least one device registered using a same account on the cloud server; or
receiving authentication information of at least one device registered for a same location as the electronic device on the cloud server.

14. The method of claim 13, wherein the identifying of the at least one device determined as the provisioning device comprises:
receiving device information of at least one external device located on the same local network from the at least one external device; and
determining the provisioning device via scoring based on at least one parameter included in the device information of the electronic device and the device information of the at least one external device.

15. The method of claim 14, wherein the device information comprises at least some of a security parameter, a performance parameter, or a utility parameter of the electronic device or the external device.

16. The method of claim 14, wherein the identifying of the at least one device determined as the provisioning device comprises determining a number of the provisioning devices, based on at least one of a number of devices located on the same local network, a maximum hop count, or a configuration of a user device.

17. The method of claim 14, wherein the identifying of the at least one device determined as the provisioning device comprises receiving information of the determined provisioning device from the cloud server.

18. A server device comprising:
a communication interface including communication circuitry;
at least one processor operatively connected to the communication interface; and
memory storing instructions which, when executed by the at least one processor, cause the at least one processor to control the server device to:
store, in the memory, authentication information of multiple devices connected to a same local network,
receive device information from at least one electronic device located on the same local network,
determine at least one device on the same local network that is to operate as a provisioning device of an edge computing service from among the multiple devices connected to the same local network via scoring based on at least one parameter included in the received device information, and
transmit at least a part of the authentication information stored in the memory to the provisioning device.

19. The server device of claim 18, wherein the instructions, when executed by the at least one processor, cause the at least one processor to control the service device to transmit, to the provisioning device, authentication information of at least one device registered using a same account as the provisioning device or registered for a same location as the provisioning device.

20. The server device of claim 18, wherein the instructions, when executed by the at least one processor, cause the at least one processor to control the server device to:
- identify multiple devices capable of operating as a provisioning device from among the at least one electronic device, and
- determine the provisioning device using device information of the identified multiple devices.

* * * * *